(12) United States Patent
Kaltenbach et al.

(10) Patent No.: US 8,961,345 B2
(45) Date of Patent: Feb. 24, 2015

(54) RANGE-CHANGE TRANSMISSION WITH AN ELECTRIC ENGINE

(71) Applicant: ZF Friedrichshafen AG, Friedrichshafen (DE)

(72) Inventors: Johannes Kaltenbach, Friedrichshafen (DE); Christian Mittelberger, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/037,646

(22) Filed: Sep. 26, 2013

(65) Prior Publication Data
US 2014/0100072 A1 Apr. 10, 2014

(30) Foreign Application Priority Data
Oct. 9, 2012 (DE) .......................... 10 2012 218 367

(51) Int. Cl.
| | | |
|---|---|---|
| *F16H 3/72* | (2006.01) | |
| *F16H 3/62* | (2006.01) | |
| *F16H 3/12* | (2006.01) | |
| *F16H 37/04* | (2006.01) | |
| *F16H 3/093* | (2006.01) | |

(52) U.S. Cl.
CPC .................. *F16H 3/62* (2013.01); *F16H 3/126* (2013.01); *F16H 2003/0931* (2013.01); *F16H 2200/0091* (2013.01); *F16H 37/046* (2013.01); *F16H 2200/0078* (2013.01); *F16H 37/042* (2013.01)
USPC .......................................................... 475/5

(58) Field of Classification Search
None
See application file for complete search history.

(56) References Cited

U.S. PATENT DOCUMENTS

| | | | | |
|---|---|---|---|---|
| 6,645,105 B2* | 11/2003 | Kima | ................................ | 475/5 |
| 6,719,655 B2* | 4/2004 | Kramer | ............................ | 475/5 |
| 7,575,529 B2* | 8/2009 | Holmes | ............................ | 475/5 |
| 7,785,221 B2* | 8/2010 | Steinwender | ..................... | 475/5 |
| 8,075,436 B2* | 12/2011 | Bachmann | ........................ | 475/5 |
| 8,579,751 B2* | 11/2013 | Phillips | ............................ | 475/5 |
| 8,647,232 B2* | 2/2014 | Guggolz et al. | ................ | 477/34 |
| 8,684,875 B2* | 4/2014 | Kaltenbach et al. | ............. | 475/5 |
| 8,771,139 B2* | 7/2014 | Ideshio et al. | .................... | 477/8 |
| 8,784,245 B2* | 7/2014 | Ideshio et al. | .................... | 475/5 |
| 2012/0240723 A1* | 9/2012 | Gluckler et al. | ................ | 74/661 |
| 2013/0109530 A1* | 5/2013 | Kaltenbach et al. | ............. | 477/5 |
| 2013/0288850 A1* | 10/2013 | Kaltenbach | ...................... | 477/5 |

(Continued)

FOREIGN PATENT DOCUMENTS

| | | |
|---|---|---|
| DE | 10 2009 054 752 A1 | 6/2011 |
| DE | 10 2011 080 069 A1 | 1/2013 |
| WO | 2013/017326 A1 | 2/2013 |

*Primary Examiner* — Dirk Wright
(74) *Attorney, Agent, or Firm* — Davis & Bujold, PLLC; Michael J. Bujold

(57) ABSTRACT

A group transmission device with an electric machine, a main transmission of a countershaft design, a splitter group of a countershaft design which is connected upstream of the main transmission and a range group connected downstream of the main transmission. In the area of the main transmission, the splitter group, and the range group, a gear ratio is variable by gear steps that can be engaged in, or disengaged from, the force flow by interlocking shifting elements. At least during a gearshift, torque of the electric machine can be introduced into the force flow in the area of the splitter group. The splitter group has at least three gear steps that can be engaged or disengaged, the main transmission has at least two gear steps that can be engaged or disengaged, and the range group has at least two gear steps that can be engaged and disengaged.

13 Claims, 13 Drawing Sheets

(56) References Cited

U.S. PATENT DOCUMENTS

| | | | |
|---|---|---|---|
| 2013/0345018 A1* | 12/2013 | Kaltenbach et al. | 477/5 |
| 2013/0345019 A1* | 12/2013 | Kaltenbach et al. | 477/5 |
| 2014/0000412 A1* | 1/2014 | Kaltenbach | 74/661 |
| 2014/0144288 A1* | 5/2014 | Glueckler | 74/661 |
| 2014/0150604 A1* | 6/2014 | Kaltenbach | 74/661 |
| 2014/0311285 A1* | 10/2014 | Kaltenbach et al. | 74/661 |
| 2014/0349810 A1* | 11/2014 | Kaltenbach et al. | 477/5 |

* cited by examiner

RANGE-CHANGE TRANSMISSION WITH AN ELECTRIC ENGINE

This application claims priority from German patent application serial no. 10 2012 218 367.1 filed Oct. 9, 2012.

FIELD OF THE INVENTION

The invention concerns a range-change transmission device with an electric machine.

BACKGROUND OF THE INVENTION

From the unpublished document DE 10 2011 080 069.7 by the present applicant, a range-change transmission device designed as an automated range-change transmission of a motor vehicle is known, which has a three-step main transmission of countershaft structure. In driving connection upstream from the main transmission is a two-step upstream transmission designed as a splitter group and downstream from the main transmission there is connected a two-step range group. An input shaft of the group transmission can be brought into functional connection with a drive aggregate of the motor vehicle and an output shaft of the group transmission can be brought into functional connection with an axle drive of the motor vehicle. An electric machine of the drive aggregate, which aggregate is formed as a hybrid drive, can be coupled to the splitter group by a planetary transmission gear system. The electric machine is connected to a first element of the planetary transmission. A second element of the planetary transmission is coupled to an input shaft of the splitter group and hence to the input shaft of the group transmission. A third element of the planetary transmission is connected to an output shaft of the splitter group and hence to an input shaft of the main transmission.

Furthermore, DE 10 2009 054 752 A1 describes a drivetrain of a motor vehicle with a hybrid drive comprising an internal combustion engine and an electric machine, with an automated group transmission connected between the hybrid drive and an axle drive. The group transmission comprises at least one countershaft-designed three-step main transmission, in driving connection with the main transmission an upstream, two-step group in particular designed as a splitter group, and in driving connection downstream from the main transmission a two-stage group in particular designed as a range group. An input shaft of the group transmission can be connected by a controllable starting clutch to the internal combustion engine. An output shaft of the group transmission is connected to the axle drive. The electric machine of the hybrid drive is connected to the, or to each countershaft.

In both of these group transmissions in each case twelve gear ratios for forward driving can be engaged. Required gearshifts in the group transmissions are in each case carried out by engaging and disengaging gear steps in the area of the splitter group, the main transmission and/or the range group, by means of interlock-type shifting elements and in so-termed range shifts or group shifts. During range shifts, the required gearshift is in each case carried out only by disengaging a gear in the area of a group, i.e. only in the area of the splitter group, the main transmission or the range group, and engaging another gear in the same group. In contrast, gearshifts required during group shifts are carried out by engaging and disengaging gears in the area of at least two of the three groups of the group transmission.

Disadvantageously, gearshifts in automated group transmissions can only be carried out with traction force interruption, when the gearshift required can be carried out as a range shift in the area of the splitter group with corresponding assistance from the electric machine. This means that gearshifts are in each case only possible without traction force interruption between two adjacent gears. Thus, only six of the eleven possible gearshifts can be carried out without traction force interruption. All other gearshifts in the group transmissions, which are carried out by range shifts in the area of the main transmission and/or in the area of the range group or by means of group shifts, cannot be carried out without traction force interruption. This results from the fact that the respective interlocking shifting elements involved in the gearshift in the area of the main transmission and/or the range group cannot be opened or closed while under load, and cannot be actively changed without traction force interruption, either by means of the electric machine or by any other procedure, to an at least approximately load-free operating condition.

In contrast to gearshifts in the area of the splitter group, whose respective interlocking shifting elements to be actuated can be changed by means of the electric machine, without traction force interruption, to an at least approximately load-free operating condition as necessary for engagement or disengagement, the shifting elements of the main transmission and/or the range group to be actuated during the operation of the automated group transmission can only by changed to an operating condition necessary for their actuation, and thus at least approximately load free, by removing the load and thus by a complete traction force interruption. However, this results in an at least brief interruption of the traction force applied at the drive output. For well known reasons traction force interruptions are undesired, particularly in the case of utility vehicles such as trucks or the like, and especially when driving uphill and downhill.

SUMMARY OF THE INVENTION

Thus the purpose of the present invention is to provide a group transmission device having an electric machine, which saves structural fitting space, is inexpensively and simply designed and can be operated with little effort and complexity, by means of which as many gearshifts as possible can be carried out without traction force interruption.

According to the invention, this objective is achieved with a group transmission device having the characteristics specified below.

The group transmission device according to the invention comprises an electric machine, a countershaft-designed main transmission, a splitter group, preferably of countershaft design, connected upstream from the main transmission, and a range group connected downstream from the main transmission. In the area of the main transmission, the splitter group and the range group, in each case a gear ratio of the group transmission device can be changed by means of interlocking shifting elements which engage gear steps in the force flow and disengage them from the force flow. At least during a gearshift of the group transmission device which is carried out by engaging and disengaging gears in the area of the splitter group, a torque of the electric machine can be introduced into the force flow.

According to the invention, the splitter group comprises at least three gears that can be engaged and disengaged, the main transmission at least two such gears, and the range group at least two such gears.

Thus, gearshifts in the group transmission device respectively between three gears of the group transmission device arranged adjacent to one another, which can be carried out only by range shifts in the area of the splitter group with at least three gear steps, can be carried out in a simply designed as well as in a space saving and cost-effective manner by means of the electric machine, while at the same time requiring little actuation effort and without entailing a traction force interruption. In the transmission device according to the invention a torque of the electric machine can be introduced into the force flow of the group transmission device in order to change the shifting elements of the splitter group that are involved in the gearshift to an at least approximately load-free operating condition as required for the opening and closing of the interlocking shifting elements, and the particular gearshift required during a shifting operation can be carried out without traction force interruption only in the area of the splitter group. The actuation effort is small, since only one shifting element of the splitter group has to be opened and one other shifting element in the area of the splitter group has to be closed during the gearshift.

The group transmission device can be designed at least as a 3×2×2 group transmission, by means of which twelve gears for forward driving can be obtained and which has the same number of wheel planes as group transmissions known from the prior art. Of the total of eleven possible gearshifts between the gears for forward driving, eight can be carried out without traction force interruption. Only the other three gearshifts are only possible when the group transmission device is in a load-free operating condition.

If in the area of the main transmission, which can also be of three-step or multi-step design, more than two gear steps can be engaged or disengaged from the force flow of the group transmission device, then correspondingly more than twelve gears for forward driving can be obtained, but this does not increase the number of power-shiftable gearshifts compared with a 3×2×2 configuration of the group transmission device.

Depending on the manner in which the electric machine is in each case connected to the splitter group, the main transmission and the range group, the group transmission device according to the invention is made either with a so-termed EDS arrangement (Electro-dynamic starter element) and/or with a so-termed ISG arrangement (Integrated starter generator).

Then, besides the gearshifts that can be power-shifted in the area of the splitter group by means of the group transmission device according to the invention in combination with the electric machine, other known hybrid functions can also be implemented. For example, purely electric driving operation of a vehicle drive-train constructed with the group transmission device according to the invention, and starting of a drive engine of a vehicle drive-train, preferably in the form of an internal combustion engine connected to the transmission input shaft of the group transmission device, by means of the electric machine, are possible. In addition an electric accumulator associated with the electric machine can be charged in a simple manner when the electric machine is operated as a generator, and boosting operation or a load point displacement can be realized. Furthermore the main transmission can also be synchronized by the electric machine and purely electric starting operation and an electrodynamic starting process can be carried out, during which a drive torque of a drive engine coupled to the transmission input shaft in the area of the electric machine is assisted.

If in the area of the main transmission and the range group there is in each case a gear engaged which is suitable as a starting gear and preferably, in the area of the splitter group during a so-termed neutral operating condition of the splitter group none of the gears of the splitter group are engaged in the force flow of the group transmission device according to the invention, then if the EDS arrangement is being used a drive torque of the drive engine coupled to the transmission input shaft can again be assisted during a so-termed electrodynamic starting process of a vehicle drive-train made with the group transmission device in the area of the electric machine, and a desired starting torque can be obtained in the area of a drive output of the vehicle drive-train coupled to the range group.

An advantageous embodiment of the group transmission device according to the invention comprises a planetary gearset, which in the area of a first shaft is connected to an input shaft of the splitter group or to a transmission input shaft of the group transmission device or which can be brought into functional connection therewith by means of a shifting element, which in the area of a second shaft is coupled to an output shaft or a gear step of the splitter group and thus to an input shaft of the main transmission or which can be connected thereto by means of a shifting element, and which in the area of a third shaft is connected to the electric machine or can be brought into functional connection therewith by means of a shifting element.

In an advantageous embodiment of the group transmission device according to the invention the first shaft of the planetary gearset can be brought into functional connection by means of a further shifting element with a component fixed on the housing, or can be coupled to the transmission input shaft or the input shaft of the splitter group. In the operating condition of the first shaft of the planetary gearset when it is connected by the shifting element to the transmission input shaft, the EDS arrangement that can be engaged exists and the electric machine can be operated as an electro-dynamic starting element. In contrast, the ISG arrangement that can also be engaged by means of the shifting element exists and the electric machine can be used as an integrated starter generator, when the first shaft of the planetary gearset is connected to the component fixed on the housing. In the ISG arrangement the electric machine is connected with the splitter group via the gear ratio of the planetary gearset.

In addition it is possible, in a neutral shift setting of the shifting element, to fully decouple the electric machine from the force flow of the group transmission device.

In the group transmission device either the EDS arrangement or the ISG arrangement can be engaged, respectively when the first shaft of the planetary gearset can be coupled by the shifting element to the electric machine or to the transmission input shaft. When the ISG arrangement is engaged the electric machine is connected to the splitter group with no gear ratio. The ISG arrangement exists when the first shaft of the planetary gearset is connected by the shifting element to the electric machine. In contrast, the EDS arrangement exists when the transmission input shaft is connected to the shaft.

In a further advantageous embodiment of the group transmission device according to the invention, the second shaft of the planetary gearset is coupled to a loose wheel of the gear step of the splitter group that is mounted to rotate on the transmission input shaft and can be connected in a rotationally fixed manner to the transmission input shaft by means of a further shifting element, or connected by the shifting element to the loose wheel, which meshes with at least one gearwheel of at least one countershaft and by way of the countershaft is connected to the main transmission. The second shaft of the planetary gearset is then connected to an output shaft of the splitter group and thus to an input shaft of the main transmission.

The electro-dynamic drive system of the group transmission device according to the invention having the electric machine thus does not cover the whole of the group transmission device, but only the splitter group. During electro-dynamic driving operation or during an electro-dynamic starting process the gears of the main transmission and of the range group can be used. Furthermore, during purely electric driving operation both a gear in the area of the main transmission and a gear of the range group can be used. It is also advantageous for the rotational speed of a drive engine connected to the transmission input shaft to be close to a rotational speed of the electric machine, since the spread of the splitter group is smaller than the spread of the group transmission device as a whole. Moreover, it is also possible in a simple manner to start or drive electro-dynamically in reverse or to synchronize the main transmission by means of the electric machine. For that reason conventional synchronizing devices or transmission brakes for synchronizing the main transmission are not needed.

It is also possible to start a drive engine preferably in the form of an internal combustion engine connected to the transmission input shaft when the force flow in the area of the group transmission device is interrupted or the latter is in neutral, and to charge an electrical energy accumulator associated with the electric machine while in the neutral operating condition of the group transmission device independently of a drive output speed of a vehicle drive-train constructed with the group transmission device according to the invention.

If the further shifting element is positioned between the planetary transmission device and the gear step of the splitter group that is or can be connected to the second shaft, the further shifting element can be arranged outside a transmission housing containing the splitter group, the main transmission and the range group. It is then possible to use a transmission housing of a transmission in which the splitter group, the main transmission and the range group are combined with a dual clutch system. The transmission housing that can then be used is an inexpensive modular standard component.

Alternatively, in a further embodiment of the group transmission device according to the invention it is provided that the further shifting element is arranged on the side of the splitter group gear that is or can be connected to the second shaft, which faces away from the planetary gearset. In this embodiment of the group transmission device the further shifting element can be integrated in the transmission housing in a simple manner and the group transmission device according to the invention can then occupy less axial fitting space.

In other advantageous embodiments of the group transmission device according to the invention, the further shifting element is an inexpensive interlocking shifting element or a frictional shifting element, and when in the form of a frictional shifting element the further shifting element can also be opened or closed under load and, for example, during a sharp deceleration of a vehicle stalling of an internal combustion engine can be avoided simply by opening the further shifting element.

Both the characteristics indicated in the claims and the features described in the following example embodiments of the group transmission device according to the invention are in each case, whether taken in isolation or in any combination with one another, suitable as further developments of the object of the invention. In relation to such further development of the object of the invention, the respective combinations of features do not have any restrictive force but are presented essentially only as examples.

BRIEF DESCRIPTION OF THE DRAWINGS

Further advantages and advantageous embodiments of the group transmission device according to the invention emerge from the example embodiments whose principle is described with reference to the drawing; in the description of the various example embodiments, for the sake of clarity the same indexes are used for components having the same structure and function.

The drawing shows.

DETAILED DESCRIPTION OF THE PREFERRED EMBODIMENTS

Figure 1:
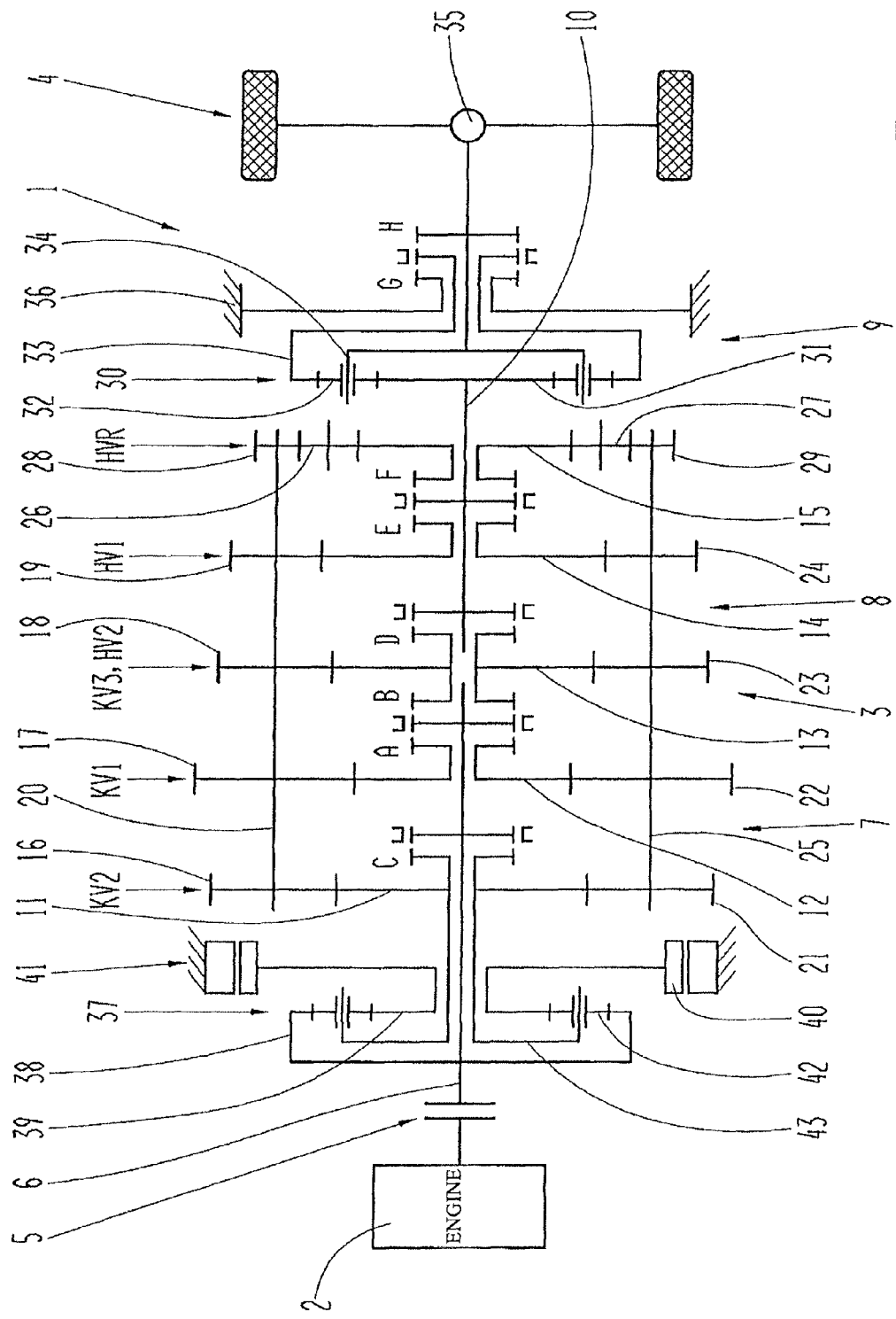
FIG. 1: A very schematic representation of a vehicle drive-train with a first embodiment of the group transmission device according to the invention.

FIG. 1 shows a vehicle drive-train 1 with a drive engine 2, a group transmission device 3 and a drive output 4. In this case the drive engine 2 is in the form of an internal combustion engine but in other embodiments of the vehicle drive-train 1 it can also be in the form of an electric machine or a combination of an internal combustion engine and an electric machine. Between the drive engine 2 and the group transmission device 3 there is arranged in this case a starting clutch 5 in the form of a friction clutch by means of which, when in the closed operating condition, the drive engine 2 is connected in a rotationally fixed manner to a transmission input shaft 6.

The group transmission device 3 comprises three transmission groups. On the transmission input side in this case there is a three-step upstream group 7 designed as a splitter group, which is of countershaft design. In addition the group transmission device 3 is configured with a main transmission 8 connected in the force flow between the drive engine 2 and the drive output 4 downstream from the splitter group 7, and a range group 9 again connected downstream in the force flow of the vehicle drive-train 1. The downstream group 9 is designed as a two-step range group. The main transmission 8 is a two-step, direct gear transmission of countershaft design.

The transmission input shaft 6, with a further central transmission shaft 10 arranged coaxially with it, forms a main shaft of the group transmission device 3 and an input shaft of the splitter group 7. Both on the transmission input shaft 6 and on the central transmission shaft 10 loose wheels 11 to 14 are mounted to rotate, which engage with fixed wheels 16 to 19 of a first countershaft 20 and with fixed wheels 21 to 24 of a second countershaft 25 and by means of which gear steps KV1, KV2, KV3, HV1, HV2 of the splitter group and the main transmission 8 for forward driving are obtained. The loose wheel 11 can be connected rotationally fixed by a shifting element C, in this case in the form of an interlocking shifting element, to the transmission input shaft 6 and together with the fixed wheels 16 and 21 forms the gear step KV2 of the splitter group 7. The further loose wheel 12 can also be coupled in a rotationally fixed manner by an interlocking shifting element A to the transmission input shaft 6 and together with the fixed wheels 17 and 22 of the countershafts 20 and 25 forms the further gear step KV1 of the splitter group 7. The third loose wheel 13 of the group transmission device 3 can be brought into functional connection by an interlocking shifting element B with the transmission input shaft 6 or by means of another interlocking shifting element D with the central transmission shaft 10. Then, together with the fixed wheels 18 and 23 in the operating condition when it is connected by the shifting element B to the transmission input shaft 6, the loose wheel 13 forms the gear step KV3 of the splitter group 7, and in the operating condition when it is connected by the shifting element D to the central transmission shaft 10, it forms the gear step HV2 of the main transmission 8.

The further loose wheel 14 can be connected by an interlocking shifting element E, and a loose wheel 15 by an interlocking shifting element F, in each case to the central transmission shaft 10. With the fixed wheels 19 and 24 of the countershafts 20 and 25 the loose wheel 14 forms the further gear step HV1 of the main transmission 8. The loose wheel 15 meshes via intermediate wheels 26, 27 with further fixed wheels 28, 29 of the countershafts, whereby in the closed operating condition of the shifting element F the gear HVR for reversing is engaged in the group transmission device 3. In the present case the shifting elements A and B and the shifting elements E and F are combined in axially space-saving dual shifting elements or synchronized claw shifting elements, whereas the shifting elements C and D are in the form of single shifting elements or synchronized claw shifting elements.

In the present case the two-step range group 9 comprises a planetary gearset 30 with three shafts and two interlocking shifting elements G and H again combined to form a dual shifting element, these being synchronized claw shifting elements. In this case a sun gear 31 of the planetary gearset 30 is connected rotationally fixed to the central transmission shaft 10 and meshes with planetary gearwheels 32 that engage with a ring gear 33. The planetary gearwheels 32 are mounted to rotate on a planetary carrier 34 which is connected to an axle transmission 35 of the vehicle drive-train 1. The ring gear 33 of the planetary gearset 30 can in this case be connected rotationally fixed by the shifting element G to a component 36 fixed on the housing or coupled in a rotationally fixed manner by the shifting element H to a planetary carrier 34, in which case the planetary gearset 30 is blocked.

By means of the group transmission device 3 configured as a 3×2×2 group transmission 7, which in the area of the splitter group and the main transmission 8 has a total of five wheel planes, twelve gears for forward driving and three gears for reversing can be obtained. For this, the three gear steps KV1 to KV3 of the splitter group, the two gear steps HV1 and HV2 for forward driving of the main transmission 8, the two gear steps of the range group 9 and the third gear step HVR of the main transmission 8, by means of which a reversing gear can be obtained, are engaged in the force flow of the group transmission device 3 or disengaged therefrom by means of the shifting elements A to H in the manner described in more detail below.

To obtain the first gear for forward driving, in the group transmission device 3 the shifting elements A, E and G have to be closed and the other shifting elements B, C, D, F and H have to be shifted to or kept in an open operating condition. For a gearshift in the group transmission device 3 from the first forward gear toward the second forward gear the shifting element A has to be opened and the shifting element C shifted to its closed operating condition, while the shifting elements E and G remain closed. For a gearshift from the second forward gear to the third forward gear the shifting element C is opened and the shifting element B is closed, while the shifting elements E and G are again left in the their closed operating condition.

If a corresponding gearshift from the third to the fourth forward gear is required, the shifting element B has to be opened and the shifting element A in the area of the splitter group 7 has to be closed. At the same time the shifting element E in the area of the main transmission 8 has to be opened and the shifting element D closed. The shifting element G of the range group 9 remains in its closed operating condition. To obtain the fifth forward gear and the sixth forward gear the shifting elements D and G must be kept closed whereas, respectively, the shifting element C or the shifting element B in the area of the splitter group 7 have to be shifted to the closed operating condition and at the same time the two further shifting elements A, B or A, C of the splitter group have to be opened.

To obtain the seventh forward gear starting from the sixth forward gear shifts have to be carried out in all three groups 7, 8 and 9 of the group transmission device 3. For this, in the area of the splitter group 7 the shifting element B must be opened and the shifting element A closed. In addition, in an area of the main transmission the shifting element D must be opened and the shifting element E closed, whereas the shifting element G is opened and the shifting element H is closed. To obtain the seventh to twelfth forward gears the shifting element H is left in the closed operating condition whereas to engage those gears in the group transmission device 3 the shifting element G is kept in its open operating condition. To obtain the seventh to ninth forward gears the shifting element E is closed and when the tenth to twelfth forward gears are engaged it is open, whereas when the tenth to twelfth forward gears are engaged the shifting element D is closed and when the seventh to ninth gears are engaged it is open.

To obtain the seventh and tenth forward gears, in each case the shifting element A is additionally closed whereas the two shifting elements B and C in the area of the splitter group 7 are open. When the eighth or eleventh forward gears are engaged, in each case the shifting element C is closed, whereas to obtain the ninth and twelfth forward gears in each case the shifting element B in the area of the splitter group 7 is kept in its closed operating condition while the two shifting elements A and C must be opened or kept in the open operating condition.

During the reverse driving of a vehicle having the vehicle drive-train 1, in the area of the range group 9 the shifting element G is closed. At the same time the shifting element F is in its closed operating condition and the gear step HVR of the main transmission 8 is engaged in the force flow, while the shifting elements D and E of the main transmission 8 are open. If the shifting element A of the splitter group 7 is closed, the first reversing gear is engaged in the group transmission device. The shifting elements B and C are then both open. To engage the second reversing gear in the group transmission device 3 starting from the first reversing gear, the shifting element A must be opened and the shifting element C closed. The third reversing gear is engaged in the group transmission device 3 when the shifting element B is closed in addition to the shifting elements F and G and the shifting elements A, C, D, H and E in the group transmission device 3 are all in their open operating conditions.

On the transmission input side, between the starting clutch 5 and the splitter group 7 there is provided a further planetary gearset 37, whose ring gear 38 is connected in a rotationally fixed manner to the transmission input shaft 6. A sun gear 39 of this further planetary gearset 37 is connected rotationally fixed to a rotor 40 of an electric machine 41 that can be operated as a generator and preferably also as a motor. The ring gear 38 and the sun gear 39 mesh with planetary gearwheels 42 mounted to rotate on a planetary carrier or planetary carrier 43. In this case the planetary carrier 43 is connected rotationally fixed to the ring gear 11 of the splitter group 7. The splitter group is designed with a small spread, so the electric machine 41 can be operated in an acceptable rotational speed range and only little reactive power passes through the further planetary gearset 37.

Depending on the respective application concerned, the further planetary gearset 37 can also be connected to the electric machine in the area of the planetary carrier or the ring gear, while the sun gear is coupled to the transmission input shaft. Otherwise, it can also be provided that the planetary carrier is connected to the electric machine. It can also be provided that the sun gear or the planetary carrier are functionally connected to the transmission input shaft 6. In addition, it is possible for the further planetary gearset 37 to be connected in the area of the ring gear or the sun gear with the shaft that constitutes an output shaft of the splitter group 7 or the loose wheel 11. In that case it can be provided that the ring gear, the planetary carrier and the sun gear of the further planetary gearset form a plus planetary gearset.

By means of the electric machine 41 connected by the further planetary gearset 37 into the force flow of the vehicle drive-train 1, when the EDS arrangement is engaged electro-dynamic starting can be carried out both in the forward and in the reverse driving direction, and for this the shifting elements A to C in the area of the splitter group 7 must be open and the shifting element E or the shifting element F in the area of the main transmission 8 must be closed. During an electro-dynamic starting process, in addition the shifting element G in the area of the range group 9 must be closed and the shifting element H is open, in order to be able to apply an electric machine drive torque of acceptable size at the drive output 4.

Furthermore, the shifting elements D, E and F can be changed by the electric machine 41 to an at least approximately synchronous operating condition, and the main transmission 8 can therefore be synchronized by means of the electric machine 41.

If one of the shifting elements A, B or C of the splitter group 7 is closed, by virtue of the then blocked further planetary gearset 37 and when the ISG arrangement is engaged the electric machine 41 is connected with a fixed gear ratio into the force flow of the group transmission device 3 or vehicle drive-train 1 and can be used as an integrated starter-generator (ISG). The ISG fitted between the drive engine 2 and the shifting range of the group transmission device 3, when operating as a generator, converts mechanical energy into electrical energy or, when operating as a motor, can for example start the internal combustion engine 2.

Besides the shiftable EDS arrangement and also the ISG function that can be obtained, gearshifts in the group transmission device 3 during which in the area of the splitter group 7 only one of the gear steps KV1, KV2 or KV3 is disengaged from the force flow of the vehicle drive-train 1 and one of the gear steps KV1, KV2 or KV3 in the area of the splitter group 7 is engaged in the force flow, can be carried out by virtue of the electric machine 41 in a manner as free from traction force interruption as possible. This concerns gearshifts between the gears 1 to 3, 4 to 6, 7 to 9 and 10 to 12 for forward driving and between the three gears for reversing.

In the embodiment of the further planetary gearset 37 shown in FIG. 1, starting from the further planetary gearset 37 the force flow passes by way of the loose wheel 11 directly toward the main transmission 8 without during this having to pass via the shifting elements A, B or C. The connection of the planetary carrier 43 to the gear step KV2 of the splitter group 7 that comprises the two fixed wheels 16 and 21 offers the possibility of bypassing the shifting elements A to C of the splitter group 7 and at the same time using the gear step KV2 for electro-dynamic starting. Otherwise, it is also possible to couple the gear steps KV1 and KV3 of the splitter group 7, which use the loose wheel 12 or the loose wheel 13, to the further planetary gearset 37 instead of the gear step KV2.

If, as shown in FIG. 1, the electric machine 41 is connected to the sun gear 39, the drive engine 2 to the ring gear 38 and the loose wheel 11 of the splitter group 7 to the planetary carrier 43, and if the further planetary gearset 37 has a fixed transmission ratio i0 which is equal to −2, then in the area of the further planetary gearset 37 the torque ratios are as follows. A ratio between a torque of the drive engine 2 and a torque of the electric machine 41 is equal to 2. The torque acting in the area of the planetary carrier 43 is higher by a factor of 3 than the torque of the electric machine 41, while the ratio between the torque acting in the area of the planetary carrier 43 and the torque of the drive engine 2 is equal to 1.5. By definition the signs of the torques are such that a positive torque always occurs during traction operation of the vehicle drive-train 1 whereas the sign of the torques during thrust operation is negative.

The rotational speed of the electric machine 41 corresponds to the difference between three times the speed of the planetary carrier 43 and twice the speed of the drive engine 2. In this case, by definition the sign of all the rotational speeds in the area of the further planetary gearset 37 are taken to be such that the speeds are positive during forward driving with a forward driving gear engaged and in the blocked operating condition of the further planetary gearset 37 when the shifting element A is closed.

The gear ratio of the gear step KV1 of the splitter group 7 formed by the loose wheel 12 and the two fixed wheels 17 and 25, is equal to 1.66. The gear ratio of the gear step KV2 of the splitter group 7, comprising the loose wheel 12 and the two fixed wheels 16 and 21, is equal to 1.29 whereas the gear ratio of the third gear step KV3 of the splitter group 7, which is formed by the loose wheel 13 and the two fixed wheels 18 and 23, is equal to 1.0 and thus corresponds to a so-termed direct gear.

If the shifting element C is actuated or closed, then the further planetary gearset 37 is directly bridged and is in so-termed block rotation in which all three shafts of the further planetary gearset 37 rotate at the same speed. The gear step KV2 of the splitter group 7 then acts for the drive engine 2.

Likewise, in this case the gear step KV2 of the splitter group 7 acts for the electric machine 41. In such a case the torques delivered by the drive engine 2 and the electric machine 41 are not increased by the further planetary gearset 37. When the shifting element A or B of the splitter group 7 is closed the further planetary gearset 37 is indirectly bridged and is not in block rotation. Then, there are respective rotational speed differences between the shafts 38, 39 and 43 of the further planetary gearset 37.

If the further planetary gearset 37 is directly or indirectly bridged, then the gear ratio between the electric machine 41 and the drive engine 2 can be calculated with reference to the so-termed Willis equation since the gear ratio between the drive engine 2 and the electric machine 41 then corresponds to the ratio between the rotational speed of the sun gear 39 and the rotational speed of the ring gear 38. Having regard to the fixed transmission ratio i0 of the further planetary gearset 37, the gear ratio i41_2 between the electric machine 41 and the drive engine 2 can be determined according to the following formulated relationship:

$$i\_41\_2 = (1-i0) \times i\_43/i\_38 + i10$$

In this, i_43 is the gear ratio of the splitter group 7 for the planetary carrier 43, i.e. the gear ratio value of the gear step KV2 of the splitter gear, which is equal to 1.29. The ratio i_38 corresponds to the gear ratio of the splitter group 7 for the ring gear of the further planetary gearset 37, which depends on the shift position of the shifting elements A, B and C.

The ratio i_41_2 is equal of 0.33 when the planetary carrier 43 is connected to the main transmission 8 by the closed shifting element A. Then, the electric machine 41 rotates more slowly than the drive engine 2. If the shifting element C is closed, the ratio i_41_2 between the electric machine 41 and the drive engine 2 is equal to 1 and the electric machine 41 rotates at the same speed as the drive engine 2. When the shifting element B is closed the ratio i_41_2 between the electric machine 41 and the drive engine 2 is equal to 1.87 and the electric machine 41 rotates more quickly than the drive engine 2.

This design of the group transmission device 3 represents a compromise in relation to a maximum electro-dynamic torque that can be produced by the electric machine 41 and a maximum rotational speed of the electric machine 41. During an electro-dynamic starting process the torque of the electric machine 41 is passed on toward the main transmission 8 by the gear step KV2.

Otherwise than as above, in an embodiment of the group transmission device not shown in the drawing, in which, as a difference from the representation according to FIG. 1, the gear ratio i_41_2 between the electric machine 41 and the drive engine 2 is equal to 1, the planetary carrier of the further planetary gearset is coupled to the loose wheel 12 of the gear step KV1 of the splitter group 7 when the ring gear of the further planetary gearset is also coupled by one of the shifting elements of the splitter group to the loose wheel of the gear step KV1. As a difference from this, if the ring gear of the further planetary gearset is connected by one of the shifting elements of the splitter group to the loose wheel 11 of the gear step KV2, the gear ratio i_41_2 between the electric machine 41 and the drive engine 2 is equal to 1.87. The ratio i_41_2 is equal to 2.99 when the ring gear of the further planetary gearset is connected by one of the shifting elements of the splitter group to the loose wheel 13 of the gear step KV3 of the splitter group 7.

In the last-described embodiment of the group transmission device the electric machine 41 always rotates at the same speed as or more quickly than the drive engine 2. However, it is possible in unfavorable operating condition ranges for the rotational speed of the electric machine to reach critical values. Nevertheless the last-described connection of the electric machine by way of the further planetary gearset to the shifting area of the group transmission device is favorable for an electro-dynamic starting process because the latter can be carried out with that gear engaged in the splitter group which has the highest gear ratio.

Again in a manner not shown in the drawing, if the planetary carrier is connected to the loose wheel 13 of the gear step KV3 of the splitter group 7 and the ring gear is coupled by one of the shifting elements of the splitter group to the loose wheel 12 of the gear step KV1, then the gear ratio i_41_2 is equal to −0.2. Then the electric machine 41 rotates slowly backward. If the ring gear is connected by one of the shifting elements of the splitter group to the loose wheel 11 of the gear step KV2, the ratio i_41_2 is equal to 0.33. If one of the shifting elements of the splitter group forms a connection between the ring gear of the further planetary gearset 37 and the loose wheel 13 of the gear step KV3, the gear ratio i_41_2 between the electric machine 41 and the drive engine 2 is equal to 1. In this embodiment of the group transmission device the electric machine always rotates at the same speed as or more slowly than the internal combustion engine.

If in the splitter group 7 one of the three gear steps KV1 to KV3 is engaged in the force flow of the group transmission device 3 by one of the shifting elements A to C, then a gear ratio i_41_8 between the electric machine 41 and the drive output of the splitter group 7 can be determined from the following formulated relationship:

$$i\_41\_8 = (1-i0) \times i\_43 + i0 \times i\_38.$$

If, as shown in FIG. 1, the planetary carrier 43 is connected to the loose wheel 11 or the gear step KV2 of the splitter group 7 and when the shifting element A is closed the ring gear 38 is coupled to the gear step KV1 or its loose wheel 12, the gear ratio i_41_8 is equal to 0.54. When the shifting element C is closed the gear ratio i_41_8 is equal to 1.29, whereas with the shifting element B closed the gear ratio i_41_8 equals 1.87.

During an electro-dynamic starting operation by means of the electric machine 41, i.e. with the EDS arrangement, or during a traction force interruption free powershift in the area of the splitter group 7, which is assisted by the electric machine 41 to the extent described earlier in order to maintain the traction force, the shifting elements A to C are open. Then the torque of the drive engine 2 is increased by a factor of 1.5 and the torque of the electric machine by a factor of 3. At the same time the rotational speeds are determined in accordance with the Willis equation described in detail above.

To produce purely electric driving operation by means of the electric machine 41 the starting clutch 5 is opened and in the area of the splitter group 7 one of the shifting elements A to C is closed. In the main transmission 8 and in the range group 9, in each case a gear is engaged in the force flow of the group transmission device 3.

During purely electric starting operation or purely electric maneuvering of a vehicle constructed with the vehicle drivetrain 1, the shifting element B of the splitter group 7, the shifting element E of the main transmission 8 and the shifting element G of the range group 9 are preferably closed. In this operating condition of the group transmission device 3 the torque of the electric machine 41 is transmitted toward the drive output 4 with a higher gear ratio than if the shifting elements A to C were open. In the area of the further planetary gearset 37 the torque of the electric machine 41 is then additionally geared up and is passed on toward the main transmission 8 with a gear ratio i_41_8 equal to 1.87 instead of the i_41_8 value of 1.66 when the shifting elements A to C are open.

If the drive engine 2 is to be started by means of the electric machine 41 when the force flow of the vehicle drive-train 1 is interrupted in the area of the main transmission 8, the further planetary gearset 37 is indirectly bridged by closing the shifting element B. Thereby, a torque provided by the electric machine 41 is transmitted toward the drive engine 2 to an extent appropriate for the starting process of the drive engine 2. With the embodiment of the group transmission device 3 shown in FIG. 1, to start the drive engine 2 the electric machine 41 only has to produce a torque smaller by a factor of 1.87 than if the electric machine 41 were directly connected to the drive engine 2. Owing to the interrupted force flow in the area of the main transmission 8 the drive engine 2 can be started regardless of the drive output speed and there is no need to actuate the service brakes in a vehicle constructed with the vehicle drive-train 1.

To connect the electric machine 41 to the drive engine 2 during a charging operation of an electric accumulator associated with the electric machine 41 with a gear ratio suitable for charging operation, the shifting element B is again closed and the further planetary gearset 37 is indirectly bridged. The electric machine 41, operating as a generator, then rotates more quickly than the drive engine 2 by a factor of 1.87, so that even if the drive engine 2 is running at idling speed the electric machine 41 can produce sufficiently high generator power. In this way increasing the rotational speed of the drive engine 2 during an electric accumulator charging operation can if necessary be avoided and the fuel consumption of the drive engine 2 in the form of an internal combustion engine can be reduced. Furthermore, undesirably loud operating noise of the drive engine 2 during a charging process can also be avoided. If the force flow of the vehicle drive-train 1 is interrupted in the area of the main transmission 8 or the neutral operating condition of the group transmission device 3 is engaged in the area of the main transmission 8, then the electric accumulator can be charged regardless of the current speed of the vehicle. Moreover, a current operating condition of the vehicle made with the vehicle drive-train 1 can be maintained without applying the service brakes.

During an electro-dynamic starting operation of the vehicle drive-train 1 the starting clutch 5 is closed and in the splitter group 7 all the shifting elements A to C are open. Both in the main transmission 8 and in the range group 9 in each case the gear steps HV1 are engaged, by means of which in each case a starting gear of the group transmission device 3 can be obtained. In the present case, for this the shifting element E or the shifting element F must be closed in the area of the main transmission 8 and the shifting element G in the area of the range group 9 also closed. During the electro-dynamic starting process a drive torque provided by the drive engine 2 is assisted in the area of the electric machine 41 and thereby a corresponding starting torque is applied in the area of the drive output 4. The electro-dynamic starting process ends when one of the shifting elements A to C is closed in the area of the splitter group 7.

Starting from an operating condition of the vehicle drive-train 1 during which the starting clutch 5 is closed and in the area of the splitter group 7 one of the shifting elements A to C is closed, and at the same time in the area of the main transmission 8 and the range group 9 one of the shifting elements D to F or G or H respectively is closed, when a gearshift is demanded in the group transmission device 3 which can be implemented only by disengaging a gear step KV1, KV2 or KV3 of the splitter group 7 and at the same time engaging a gear step KV1, KV2 or KV3 of the splitter group 7, the following procedure is adopted in order to be able to carry out the gearshift in the group transmission device 3 in a manner at least approximately free from traction force interruption.

First, the torques delivered by the drive engine 2 and the electric machine 41 are adjusted in such manner that whichever of the shifting elements A, B or C is closed is changed to an at least approximately load-free operating condition and a desired traction force variation is produced in the area of the drive output 4. During this it is possible to reduce the traction force during upshifts in the group transmission device 3 to the level of the respective target gear to be engaged. Whichever of the shifting elements A, B or C is changed to an at least approximately load-free operating condition when the ratio of the torques of the drive engine 2 and the electric machine 41 corresponds substantially to the fixed transmission ratio i0 of the further planetary gearset 37.

If the electric machine 41 can only provide a torque that is too small for this, the torque of the drive engine 2 has to be reduced correspondingly. Then, however, in the area of the drive output 4 a certain traction force loss cannot be avoided, although the traction force in the area of the drive output 4 does not fall to zero.

If whichever of the shifting elements A, B or C of the splitter group 7 is closed is made essentially free from load by the procedure described above, it is changed to its open operating condition. Then the shifting element A, B or C that is to be closed because of the gearshift demanded in the splitter group 7 is changed by appropriate adjustment of the torques of the electric machine 41 and the drive engine 2 to an operating condition that is advantageous for the engagement of the shifting element A, B, or C, or synchronized, while maintaining the traction force to be supplied at the drive output 4. When the advantageous operating condition for the engagement of the shifting element A, B or C to be engaged has been reached, the shifting element is changed to its closed operating condition and the gearshift demanded is essentially completed. Again thereafter, a change of the load in the area of the drive engine 2 and also of the electric machine 41 can be made as a function of the operating strategy being implemented in each case. Gear ratio changes by engaging and disengaging the gears KV1 to KV3 in the area of the splitter group 7 can also be carried out with traction force interruption when the load in the area of the drive engine 2 has been completely eliminated.

If, in the area of the main transmission 8 and the range group 9, in each case a starting gear suitable for an electro-dynamic starting process is engaged, for example by closing the shifting elements E and G, and if the splitter group 7 is in the neutral operating condition while the starting clutch 5 is closed, a vehicle constructed with the vehicle drive-train 1 can for example be started from rest by appropriate actuation of the drive engine 2 and the further planetary gearset 37, by means of the electric machine 41.

During such a preferred electro-dynamic starting process of the vehicle drive-train 1 during which a starting torque of the drive engine 2, while the starting clutch 5 is closed, is assisted in the area of the electric machine 41, in order to be able to change under load to an operating mode of the vehicle drive-train 1 in which the starting torque of the drive engine passes by way of the starting clutch 5 then operating with slip and is assisted in the area of the electric machine 41 only to a small extent or even not at all, the vehicle drive-train 1 is preferably actuated as described in greater detail below. Such an operating mode change is necessary for example, when in the area of the electric machine 41, owing to an energy accumulator that is too full or too empty, the desired drive power can no longer be provided because then the torque cannot be assisted sufficiently by means of the electric machine 41.

First the transmission capacity of the starting clutch 5 is reduced and the clutch is changed to slipping operation. By controlling the transmission capacity of the starting clutch 5 and the torque provided by the electric machine 41, the rotational speed in the area of the splitter group 7 is changed in such manner that one of the shifting elements A, B or C is brought to an at least approximately synchronous operating condition. The at least approximately synchronous shifting element A, B or C of the splitter group 7 is closed, whereby for the drive engine 2 in the area of the group transmission device 3 a fixed gear is engaged and the starting process of the vehicle drive-train 1 can be continued conventionally by means of the drive engine 2 with the starting clutch 5 slipping at the same time. During the starting process the starting clutch 5 can be relieved from load by appropriate operation of the electric machine 41 during the starting process.

Otherwise than the above it is also possible, depending on the operating condition or by virtue of a superimposed operating strategy, to generate a demand to change from a conventional starting process of the vehicle drive-train by means of the drive engine 2 and the slipping starting clutch 5 to an electro-dynamic starting process with as little traction force interruption as possible. Starting from an operating condition of the vehicle drive-train 1 in which the starting clutch 5 is transmitting a torque of the drive engine 2 with slip and in the area of the splitter group 7 the shifting element A, B or C is closed and in the area of the main transmission 8 and also in the area of the range group 9 in each case the gear steps required in order to obtain the starting gear ratio are engaged in the force flow of the vehicle drive-train 1 by means of the shifting element E and the shifting element G, the torque of the drive engine 2 or the transmission capacity of the starting clutch 5 and at the same time the torque of the electric machine 41 are controlled in such manner that the closed shifting element A, B or C of the splitter group 7 is brought to an at least approximately load-free operating condition and in the area of the drive output 4 a desired traction force variation is produced. This avoids a traction force interruption as much as possible. The respective shifting element A, B or C is substantially load-free when a ratio between the torque of the drive engine 2 and the electric machine 41 corresponds approximately to the fixed gear ratio i0 of the further planetary gearset 37. If the electric machine 41 cannot supply a torque required for the desired traction force variation, the load in the area of the drive engine 2 or the starting clutch 5 is correspondingly reduced so that in the area of the drive output 4 a smaller traction force reduction then takes place. However, the traction force does not fall to zero.

In its at least approximately load-free operating condition the closed shifting element A, B or C is opened. Then, the transmission capacity of the starting clutch 5 and preferably also the drive torque of the drive engine 2 and the drive torque of the electric machine 41 are regulated and a rotational speed difference in the area of the starting clutch 5 is displaced toward zero. Thereby the slip in the area of the starting clutch 5 is reduced and the starting clutch 5 changes to a more engaged operating condition starting from which it is fully closed. In the closed operating condition of the starting clutch 5 the starting process of the vehicle drive-train 1 in the electro-dynamic operating mode is continued.

Furthermore, during a gearshift in the group transmission device 3 during which a gear step HV1, HV2 of the main transmission is disengaged and a gear step HV1, HV2 of the main transmission is to be engaged, the main transmission 8 can be synchronized by means of the electric machine 41.

Starting from an operating condition of the vehicle drive-train 1 in which the starting clutch 5 is closed and in the area of the splitter group 7 one of the gear steps KV1, KV2 or KV3 and in the area of the main transmission 8 a gear step HV1, HV2 are engaged in the force flow of the vehicle drive-train 1, the engaged gear HV1, HV2 in the main transmission 8 is disengaged in a load-free operating condition during a shift with traction force interruption in the area of the main transmission 8. Then, by regulating the rotational speed of the electric machine 41 the main transmission 8 is synchronized with the help of the electric machine 41. During this the starting clutch 5 can be left in its closed operating condition or changed to the open operating condition. In the closed operating condition of the starting clutch 5 the torque of the drive engine 2 is controlled in such manner that the drive engine 2 assists the synchronization of the main transmission 8. In the open operating condition of the starting clutch 5 the main transmission 8 is synchronized by the electric machine 41 alone.

If in the area of the splitter group 7 none of the shifting elements A to C is closed and at the same time in the area of the main transmission 8 one of the gear steps HV1 or HV2 of the main transmission 8 is connected to the central transmission shaft 10, then if there is a demand for a gearshift in the group transmission device 3 which can be carried out solely by shifting between the gears HV1 and HV2 of the main transmission 8, the engaged gear of the main transmission 8 is disengaged from the force flow in a load-free operating condition during a shift with traction force interruption while at the same time the starting clutch 5 is closed. In order to be able to engage the gear HV1 or HV2 of the main transmission 8 within short operating times, once the old gear has been disengaged the main transmission 8 should be synchronized to the new gear. The synchronizing of the main transmission 8 is carried out with the help of appropriate control of the rotational speeds of the drive engine 2 and the electric machine 41. During this process the starting clutch 5 must remain closed, since otherwise the speed of the input shaft of the splitter group 7, i.e. the transmission input shaft 6, would be undefined.

Figure 2:
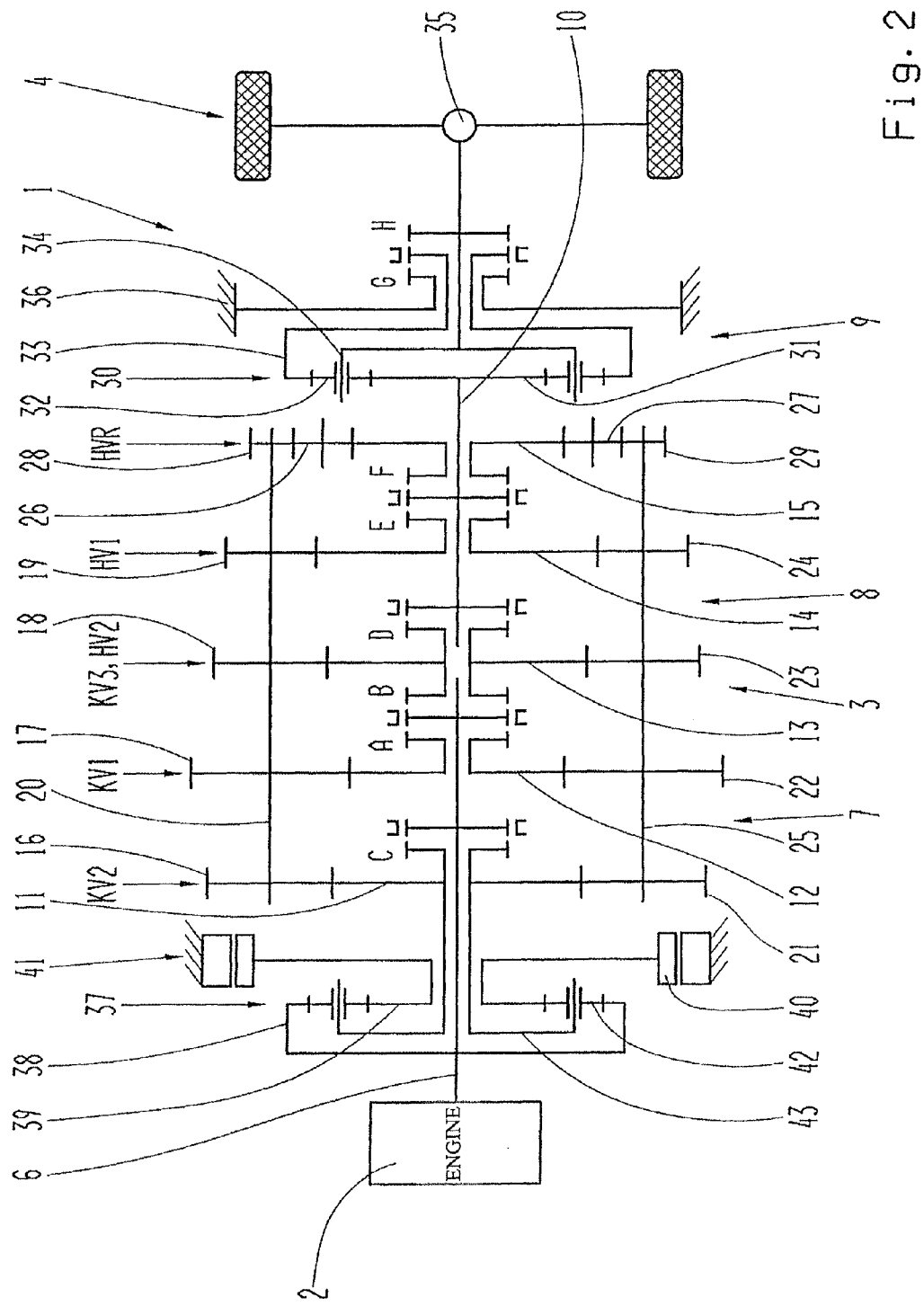
FIG. 2: A representation corresponding to FIG. 1, of a vehicle drive-train with a second embodiment of the group transmission device according to the invention.

The vehicle drive-train 1 shown in FIG. 2 differs from the vehicle drive-train 1 shown in FIG. 1 only in that the vehicle drive-train 1 of FIG. 2 is made without the starting clutch and therefore has a simpler structure. As described in the case of FIG. 1, starting processes of the vehicle drive-train 1 in FIG. 2 can be carried out by means of the electric machine 41 in the electro-dynamic starting operation mode. A vehicle constructed with the vehicle drive-train 1 shown in FIG. 2 cannot be started conventionally. The drive engine 2 is permanently connected to the transmission input shaft 6. In this case the procedures described in connection with FIG. 1 can all be carried out except for the one during which the starting clutch 5 has to be changed partially to slipping operation or even opened completely.

Figure 3:
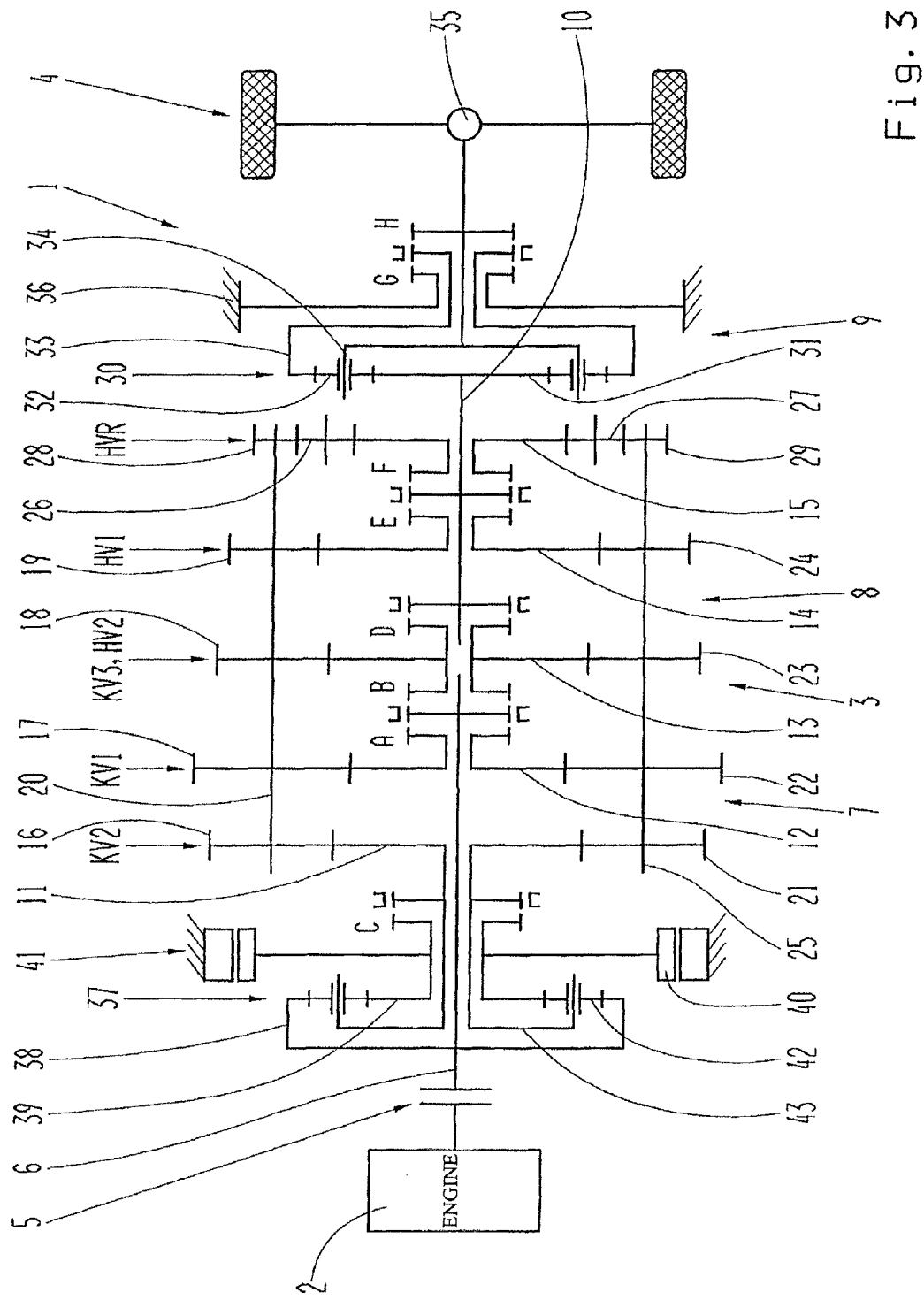
FIG. 3: A representation corresponding to FIG. 1, of a vehicle drive-train with a third embodiment of the group transmission device according to the invention.

In the vehicle drive-train 1 shown in FIG. 3, which corresponds in essence to the vehicle drive-train 1 of FIG. 1, the position of the shifting element C is different from its position in the vehicle drive-train 1 shown in FIG. 1. The shifting element C in FIG. 3 is arranged between the loose wheel 11 and the electric machine 41 and the sun gear 39 of the further planetary gearset 37 can be connected rotationally fixed to the planetary carrier 43 by means of the shifting element C. The shifting element C is in the clutch space of a dual clutch system that can be combined with the shifting area of the group transmission device 3 and is therefore arranged outside the transmission housing. Thus, the transmission housing of the group transmission device 3 can be made as an inexpensive modular standard component. Furthermore, the shifting transmission area of the group transmission device 3, i.e. the area of the group transmission device 3 containing the splitter group 7, the main transmission 8 and the range group 9, can be made modular just as the combination with a dual clutch can be, and can therefore be produced more inexpensively.

Figure 4:
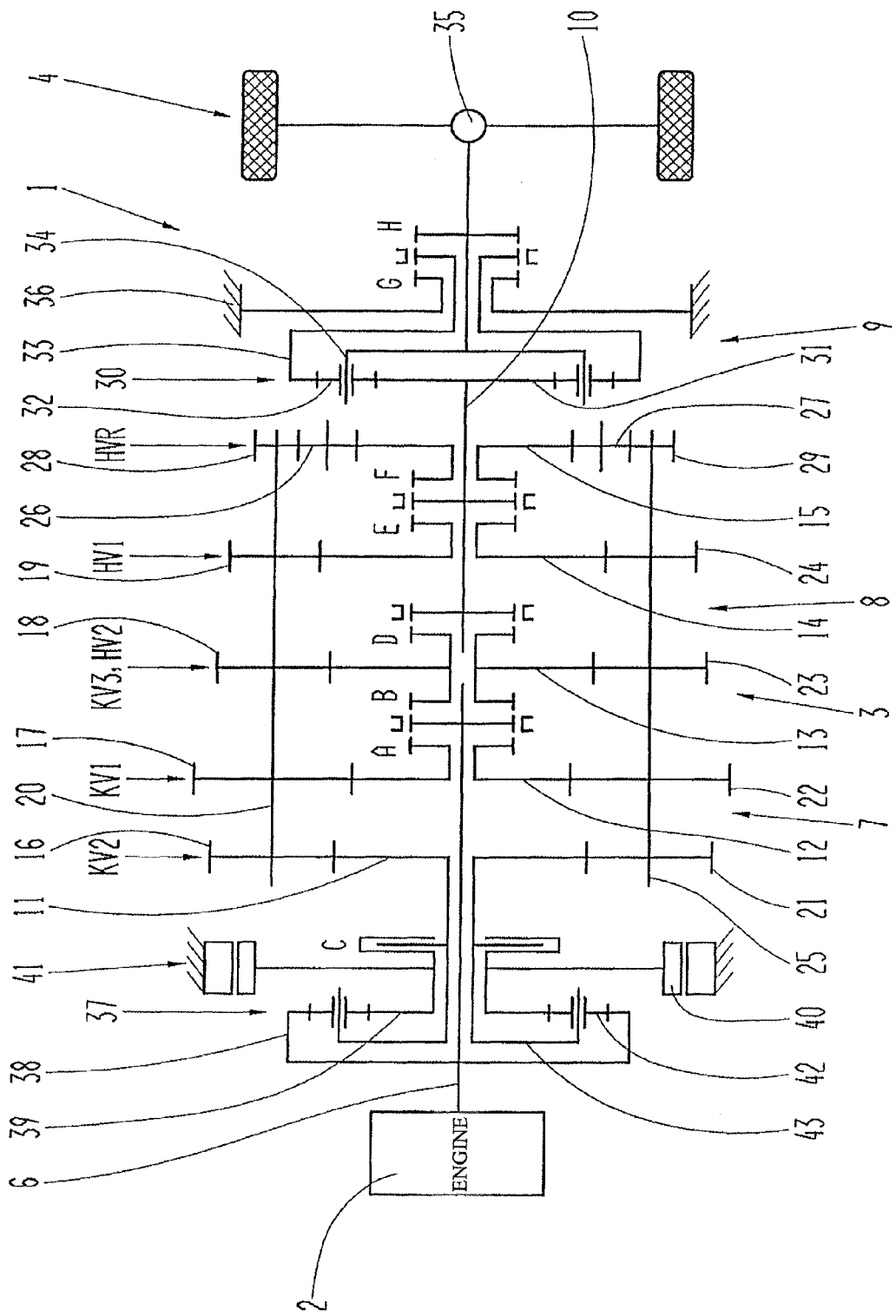
FIG. 4: A representation corresponding to FIG. 1, of a vehicle drive-train with a fourth embodiment of the group transmission device according to the invention.

FIG. 4 shows a further example embodiment of the vehicle drive-train 1, which is again formed without the starting clutch 5 and in which the sun gear 39 of the further planetary gearset 37 can be brought into functional connection with the planetary carrier 43 by means of the shifting element C in the form of a frictional shifting element. The shifting element C is again arranged between the electric machine 41 and the loose wheel 11, so that the advantages described in connection with FIG. 3 are available. In the event of emergency braking, when in the group transmission device 3 the second, fifth, eighth or eleventh gear for forward driving or when the second reversing gear is engaged, stalling of the drive engine 2 can be avoided by opening the shifting element C under load. Conventional starting of the vehicle drive-train 1 as when a starting clutch 5 is present cannot be carried out by means of the shifting element C, but during an electro-dynamic starting operation of the vehicle drive-train 1 shown in FIG. 4 the electric machine 41 can be assisted by appropriate adjustment of the transmission capability of the shifting element C.

Figure 5:
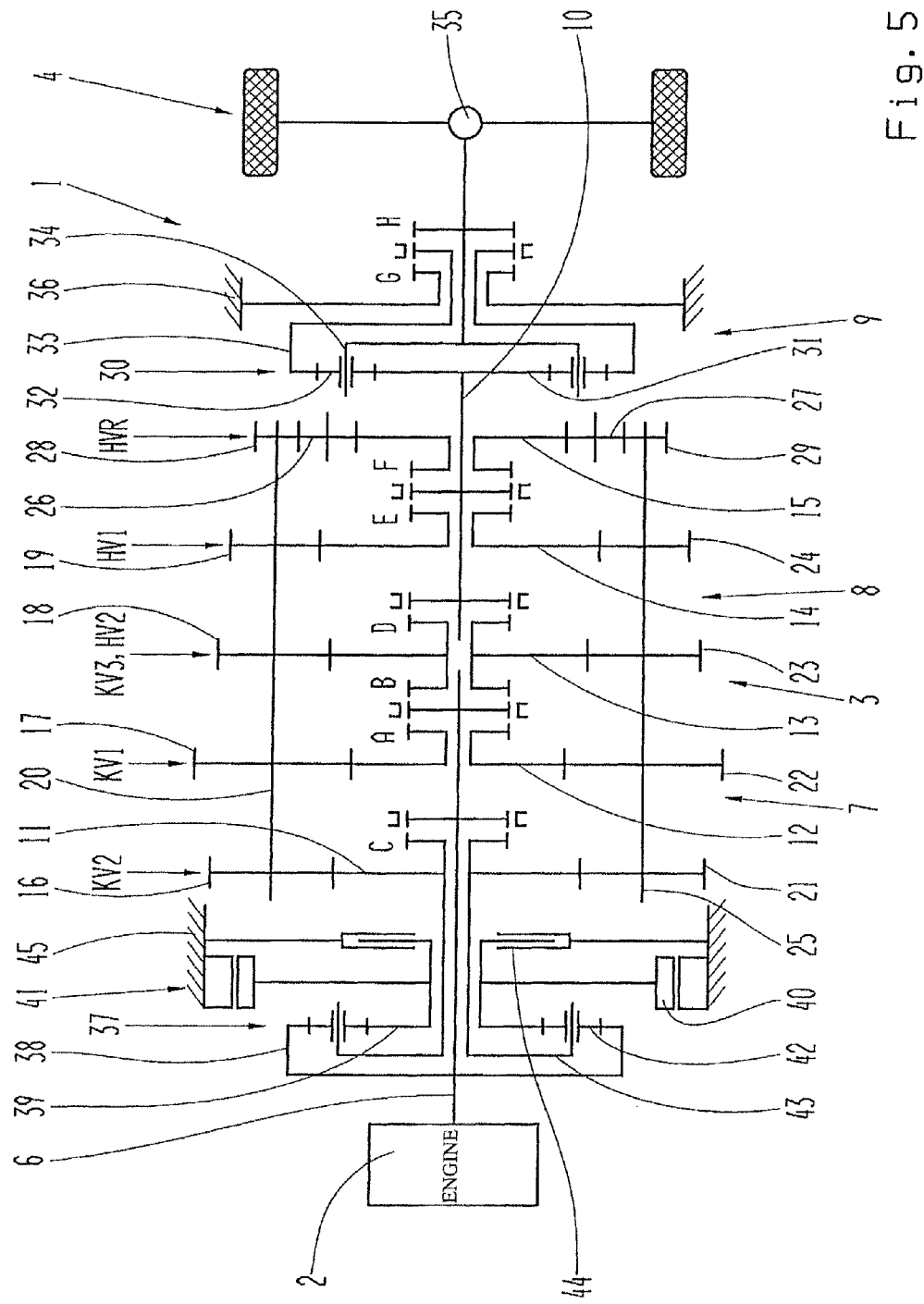
FIG. 5: A representation corresponding to FIG. 1, of a vehicle drive-train with a fifth embodiment of the group transmission device according to the invention.

The vehicle drive-train 1 shown in FIG. 5 differs from the vehicle drive-train 1 shown in FIG. 1, in that the drive-train 1 of FIG. 5 is made without a starting clutch 5 and the sun gear 39 of the further planetary gearset 37 can be brought into functional connection with a component fixed to the housing, by means of a shifting element 44 in the form of a friction brake. By means of the shifting element 44, during an electrodynamic starting operation of the vehicle drive-train 1 in FIG. 5 the electric machine 41 can be assisted. Moreover, by means of the shifting element 44 a conventional starting process, for example as with the starting clutch 5, can be carried out.

FIGS. 6 to 11 show respective example embodiments of the group transmission device 3 according to the invention, in each case comprising additional shifting elements I and J. In this case the shifting elements I and J are in the form of synchronized claw shifting elements and are combined in a space-saving dual shifting element. In the closed operating condition of the shifting element I, in each of the group transmission devices 3 of FIGS. 6 to 11 the EDS arrangement is engaged, whereas when the shifting element J is closed the ISG arrangement is activated. If both the shifting elements I and J are open, the electric machine 41 is completely decoupled from the force flow of the vehicle drive-train 1.

The decoupling of the electric machine 41 can be appropriate in order to avoid the zero-load losses or in the event of a fault, for example if there is a defect in the electrical system.

In further embodiments of the group transmission device (not illustrated), which correspond in essence to the embodiments in FIGS. 6 to 11, in each case only the shifting element I is provided. Then, however, the ISG arrangement cannot be obtained and only the EDS arrangement can be engaged by closing the shifting element I. When the shifting element I is open, the electric machine 41 is again decoupled from the force flow of the vehicle drive-train 1.

A shift between the shifting element I and the shifting element J under load only takes place when one of the shifting elements A to C in the splitter group is closed. If this prerequisite is fulfilled, a load reduction first takes place at the electric machine 41 and the load is taken up by the drive engine 2. If the rotational speed of the transmission input shaft 6 or the input shaft of the splitter group 7 is too low, the starting clutch 5 is operated with slip. When the shifting elements I and J are at least approximately in a load-free operating condition, a shift is carried out between these shifting elements, the shifting elements I and J being synchronized by regulating the rotational speed of the electric machine 41.

Figure 6:
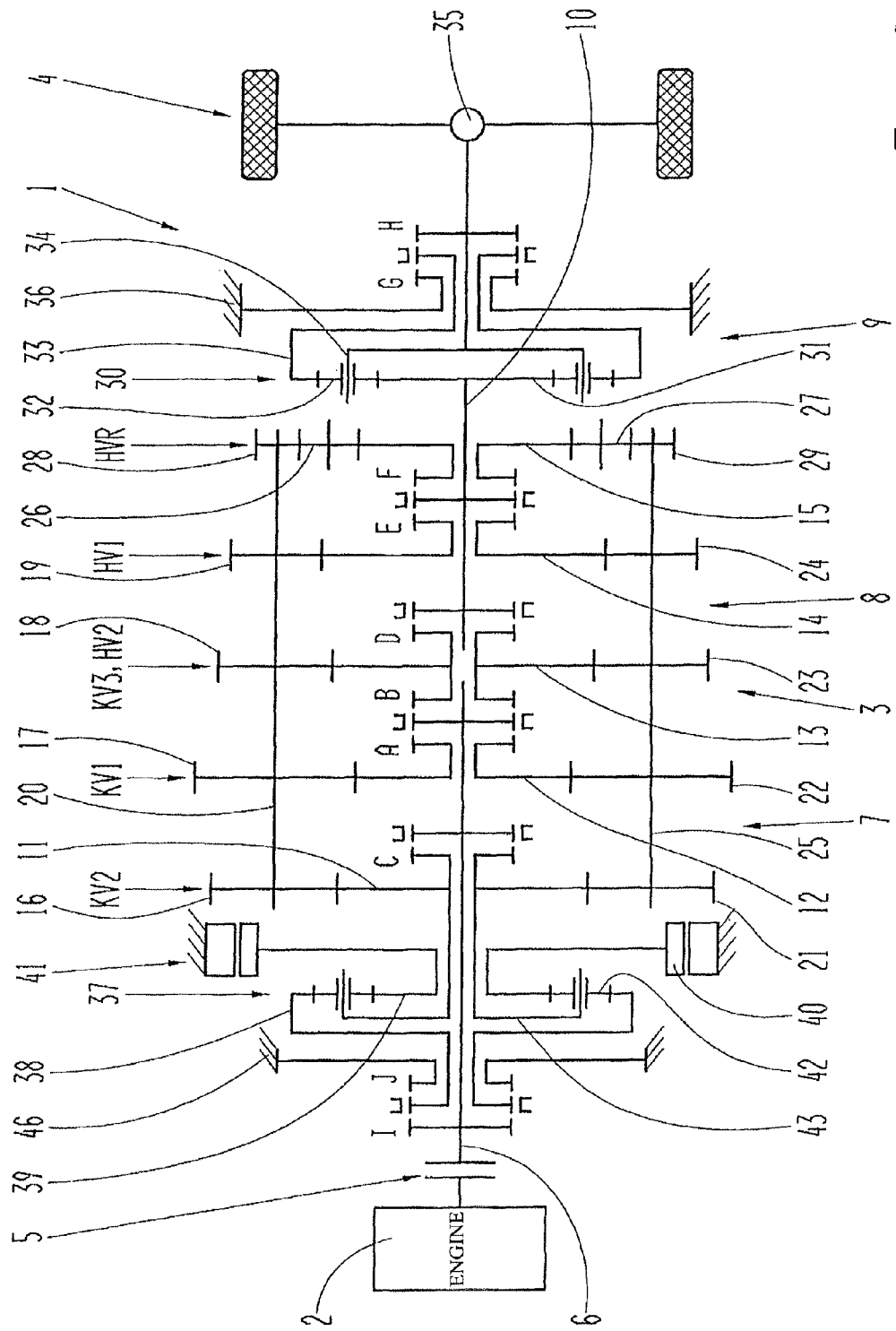
FIG. 6: A representation corresponding to FIG. 1, of a vehicle drive-train with a sixth embodiment of the group transmission device according to the invention.
Figure 7:
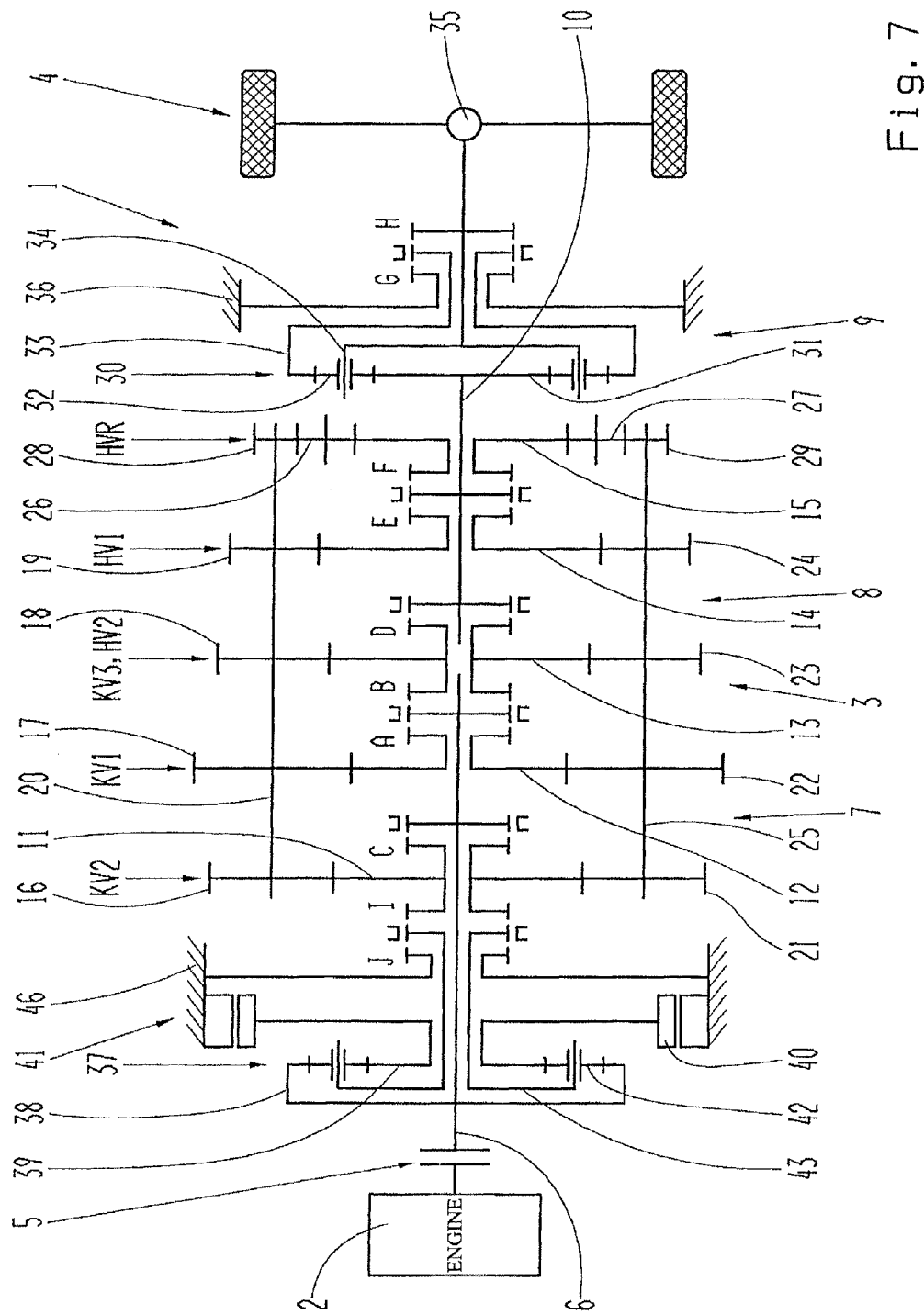
FIG. 7: A representation corresponding to FIG. 1, of a vehicle drive-train with a seventh embodiment of the group transmission device according to the invention.

In the example embodiments of the group transmission device 3 shown in FIGS. 6 and 7 in each case a shaft of the further planetary gearset 37, in this case either the ring gear 38 or the planetary carrier 43, can be connected by the shifting element I to the input shaft 6 of the splitter group 7 or to the output shaft 11 of the splitter group 7. The same shaft 38 or 43 of the further planetary gearset 37, respectively, can be coupled by the shifting element J to a component 46 fixed on the housing, so that by way of the further planetary gearset 37 which then acts as a constant gear for the electric machine 41, the electric machine 41 is connected into the force flow of the vehicle drive-train 1. Thereby, the electric machine 41 can be designed for a lower maximum torque and for higher rotational speeds.

Figure 8:
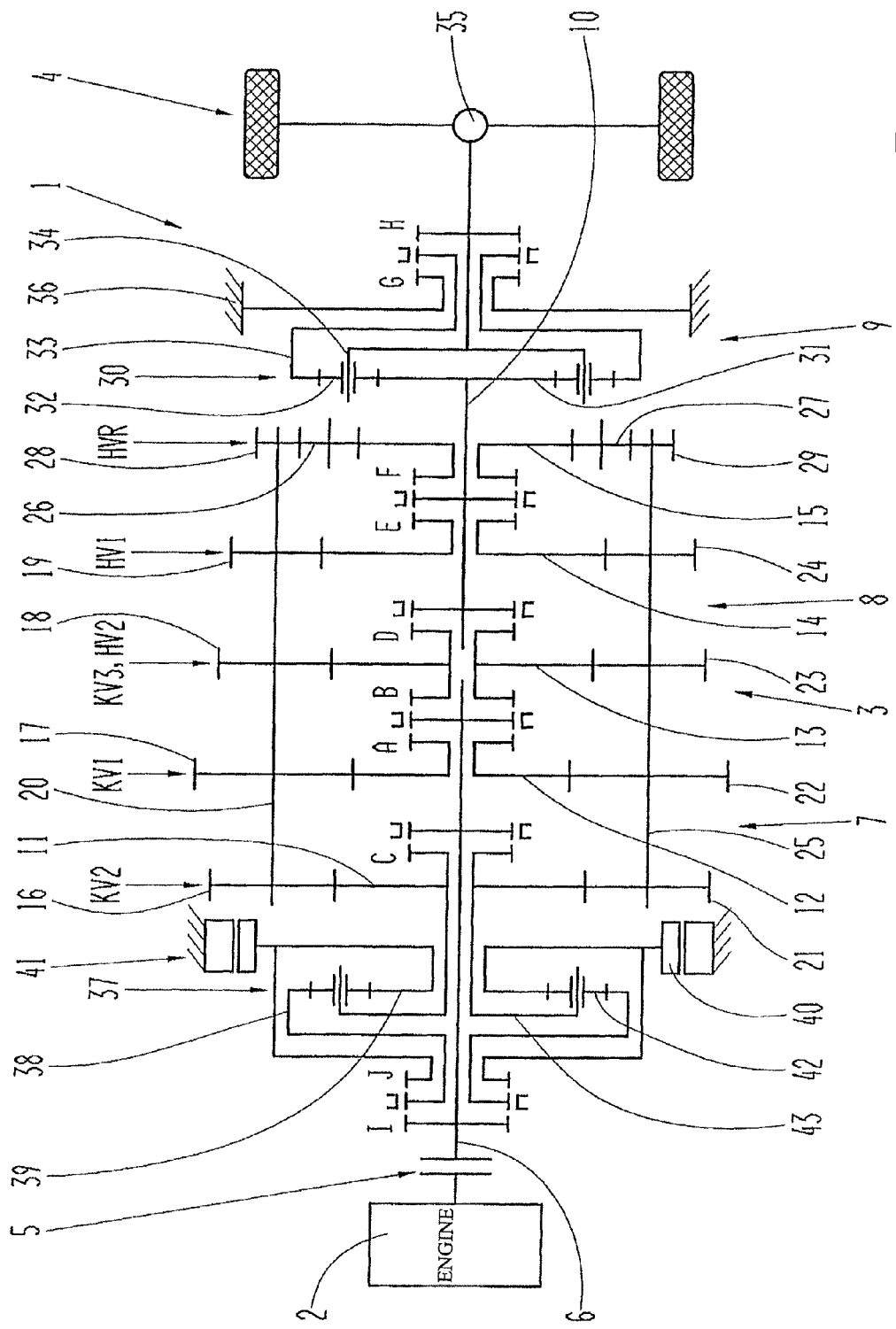
FIG. 8: A representation corresponding to FIG. 1, of a vehicle drive-train with an eighth embodiment of the group transmission device according to the invention.
Figure 9:
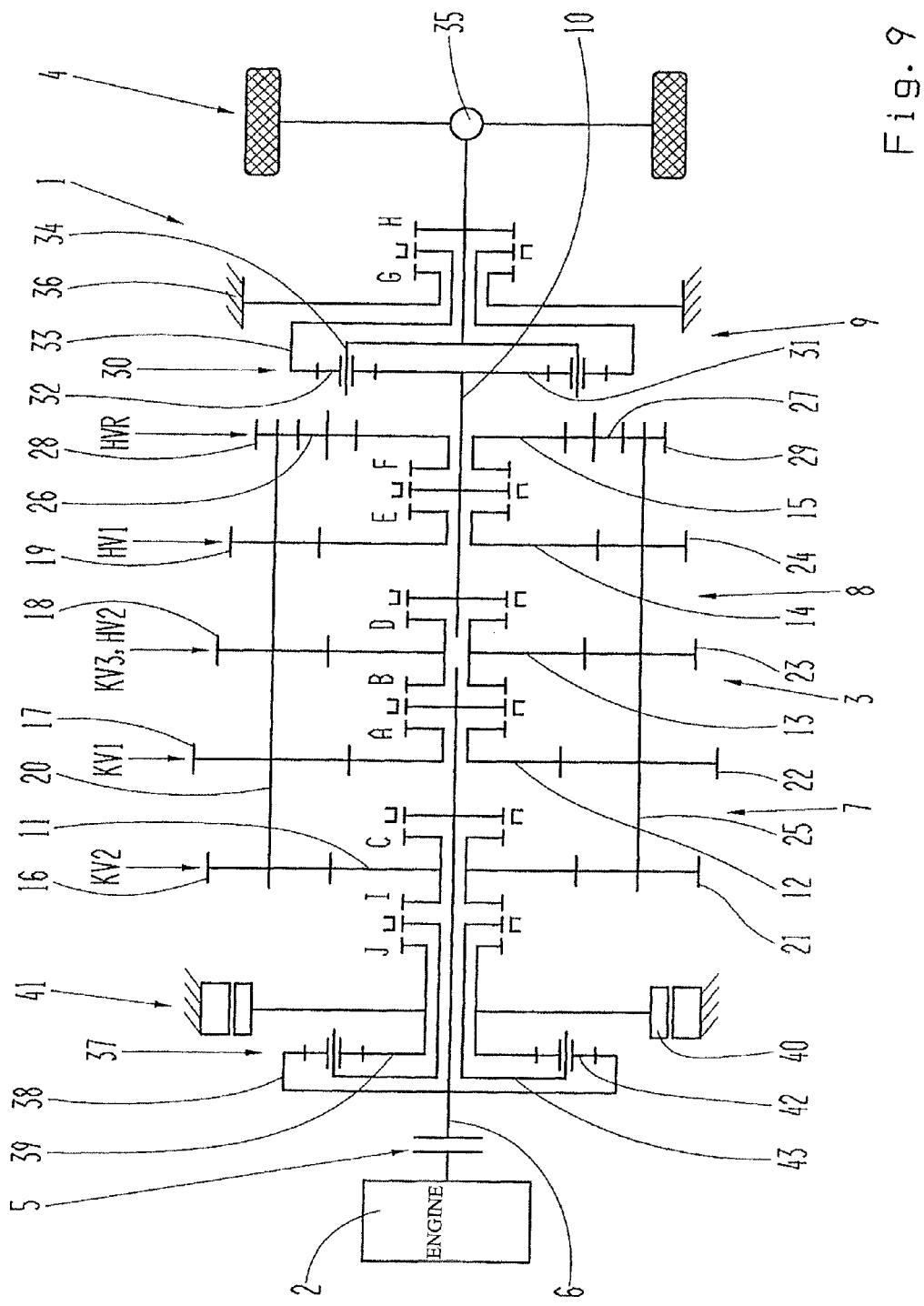
FIG. 9: A representation corresponding to FIG. 1, of a vehicle drive-train with a ninth embodiment of the group transmission device according to the invention.

FIGS. 8 and 9 show respective example embodiments of the group transmission device 3 in which, in each case, a shaft of the further planetary gearset 37, in this case either the ring gear 38 or the planetary carrier 43, is connected by the shifting element I to the input shaft 6 of the splitter group 7 or to the output shaft 11 of the splitter group 7. The same shaft 38 or 43 of the further planetary gearset 37 can be coupled by the shifting element J, respectively, to another shaft of the further planetary gearset 37, in this case to the sun gear 39, so that then, by virtue of the blocked further planetary gearset 37, the electric machine 41 is connected into the force flow of the vehicle drive-train 1 with a gear ratio 1 without gearing losses in the area of the further planetary gearset 37 and at the same time with a lesser effect of the inertial masses of the electric machine 41.

As a difference from the representation in FIG. 8, it can also be provided that the ring gear of the further planetary gearset is connected to the planetary carrier instead of to the sun gear when the shifting element J is closed.

Figure 10:
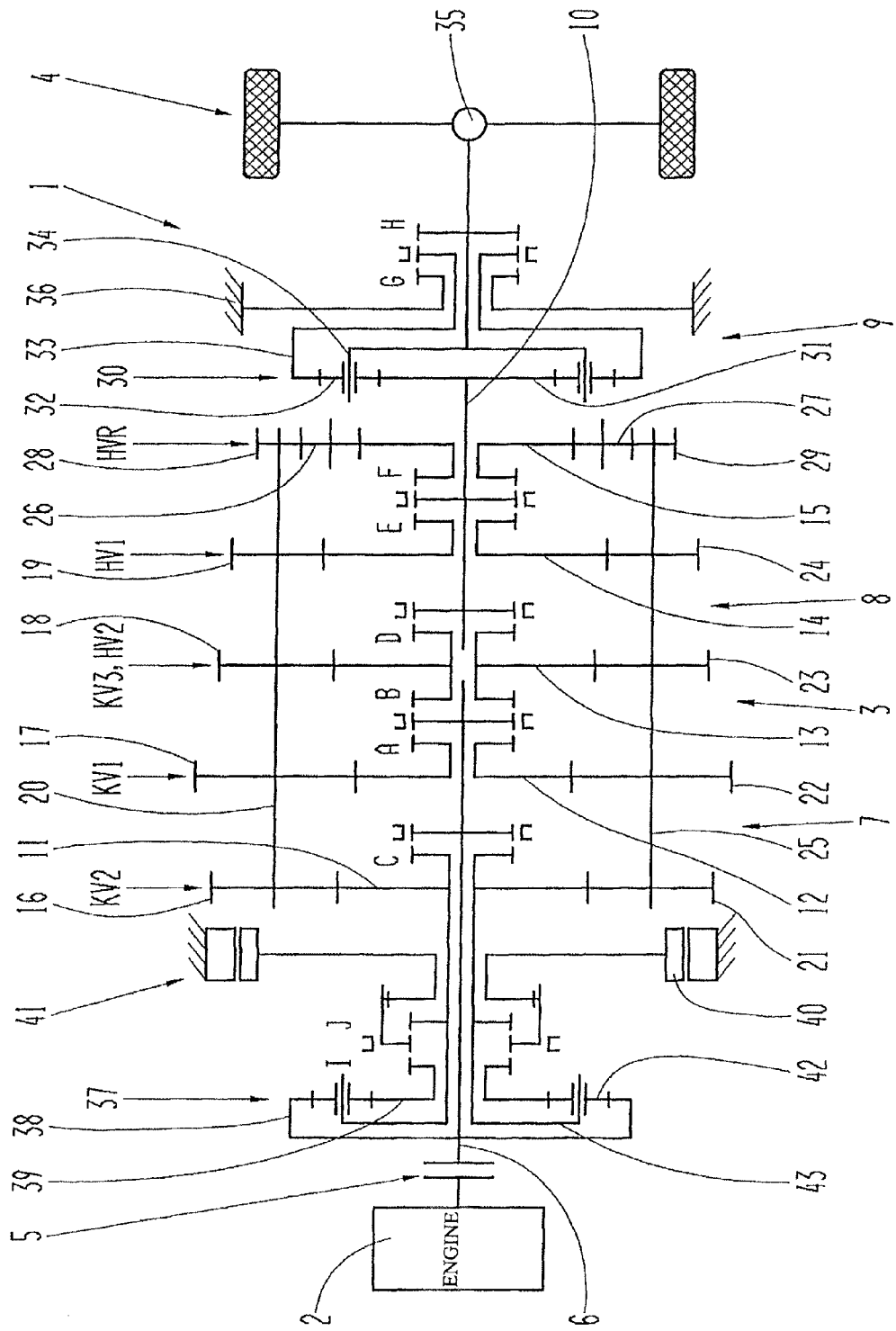
FIG. 10: A representation corresponding to FIG. 1, of a vehicle drive-train with a tenth embodiment of the group transmission device according to the invention.
Figure 11:
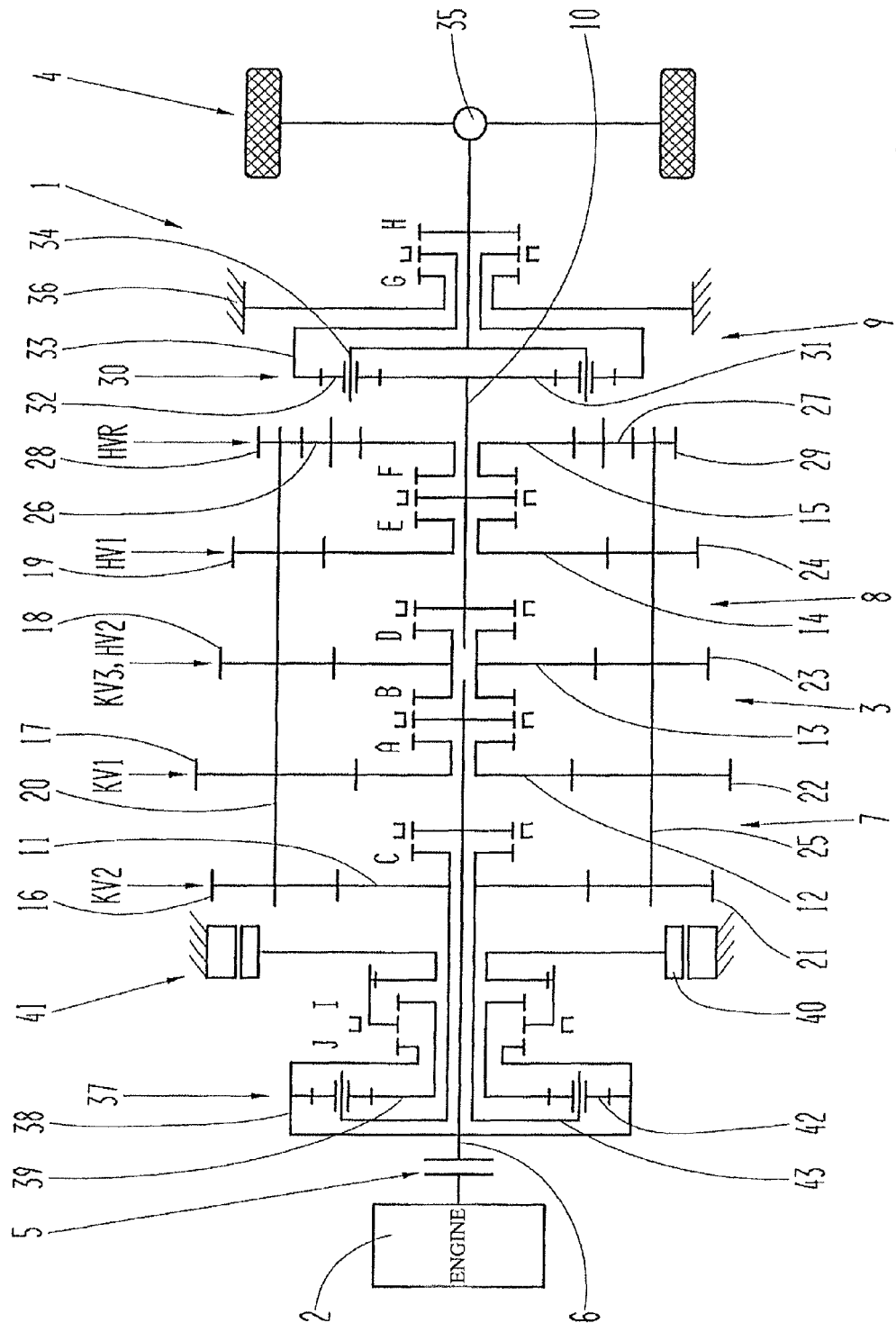
FIG. 11: A representation corresponding to FIG. 1, of a vehicle drive-train with an eleventh embodiment of the group transmission device according to the invention.

In the example embodiments of the group transmission device 3 shown in FIGS. 10 and 11 the electric machine 41 can be coupled by means of the shifting element I to a shaft of the further planetary gearset 37, respectively either to the sun gear 39 or to the ring gear 38. By means of the shifting element J the electric machine 41 can be connected either to the output shaft 11 of the splitter group 7 or to the input shaft 6 of the splitter group 7 and then, when the shifting element J is closed and at the same time the shifting element I is open, the further planetary gearset 37 will rotate idly or free from any torque. The electric machine 41 is then again connected into the force flow of the vehicle drive-train 1 without gearing losses in the area of the further planetary gearset 37 and at the same time the inertial mass of the electric machine 41 has less effect.

Figure 12:
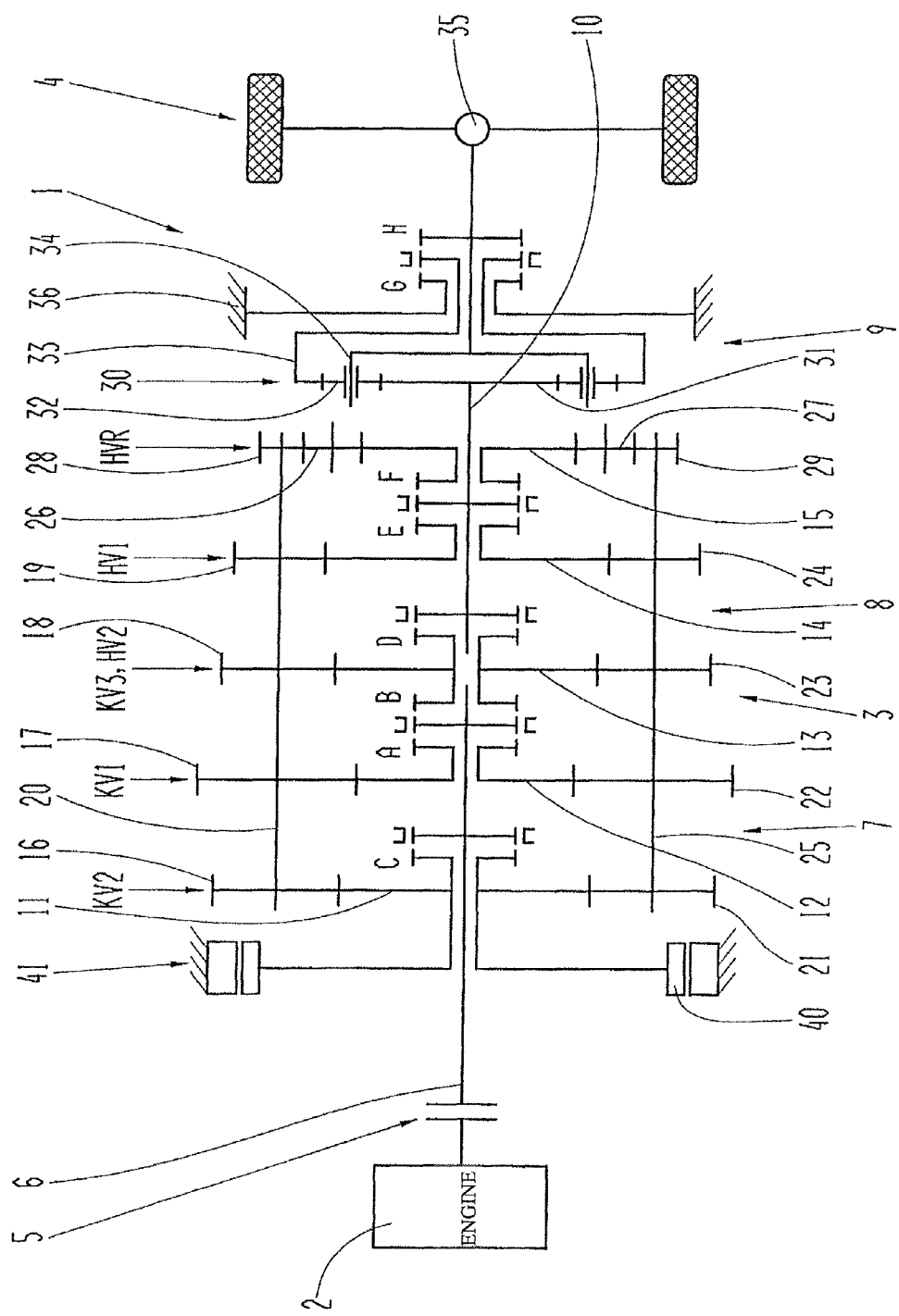
FIG. 12: A representation corresponding to FIG. 1, of a vehicle drive-train with a twelfth embodiment of the group transmission device according to the invention.
Figure 13:
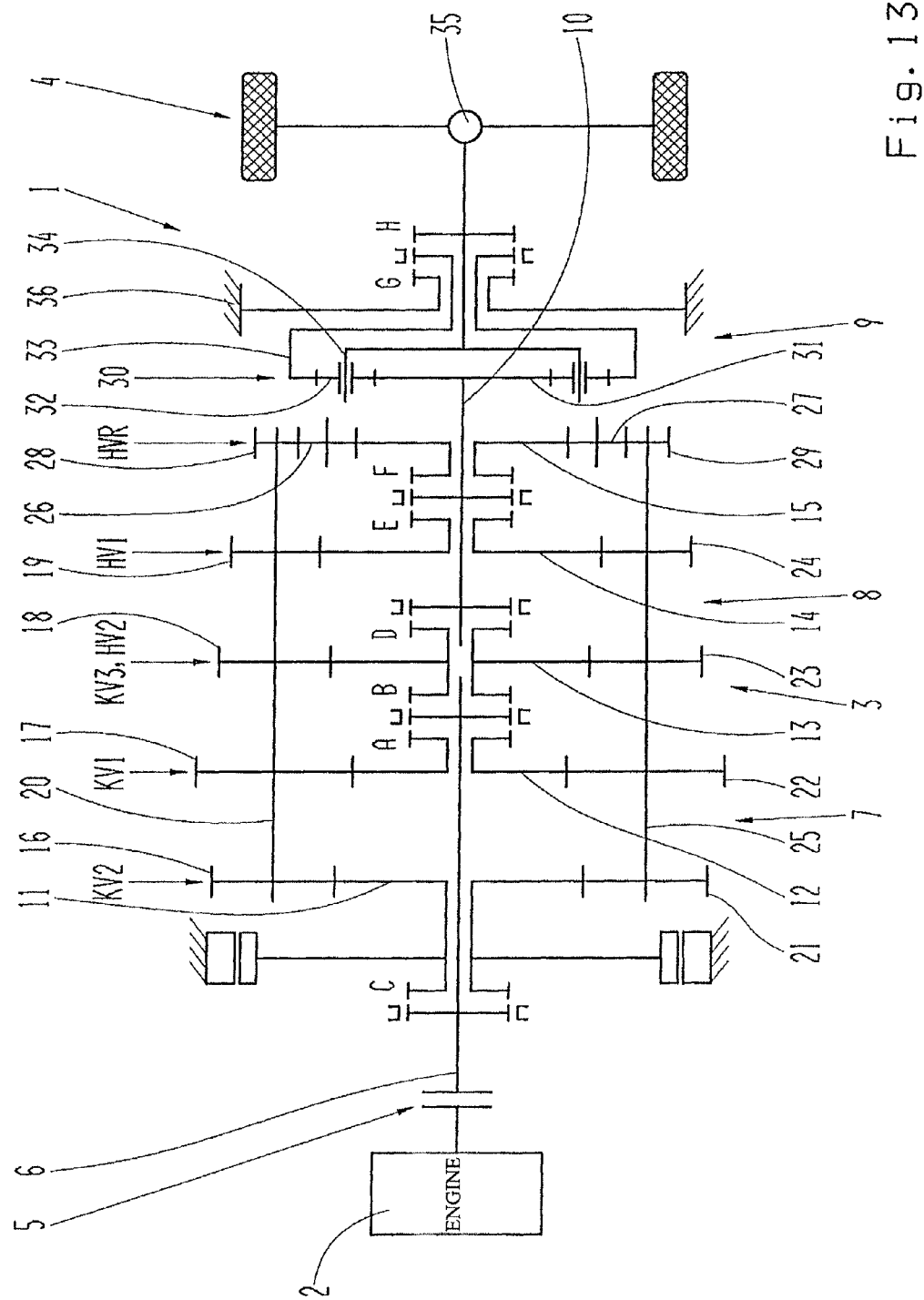
FIG. 13: A representation corresponding to FIG. 1, of a vehicle drive-train with a thirteenth embodiment of the group transmission device according to the invention.

FIGS. 12 and 13 show further example embodiments of the group transmission device 3 according to the invention, which are constructed without the further planetary gearset 37 and in which the electric machine 41 is connected directly to the loose wheel 11 or output shaft of the splitter group 7. The two embodiments of the group transmission device 3 shown in FIGS. 12 and 13 differ from one another only in the arrangement of the shifting element C, which in the embodiment of FIG. 12 is positioned between the loose wheels 11 and 12 and in the embodiment of FIG. 13 is positioned between the starting clutch 5 and the electric machine 41.

With both the embodiments of the group transmission device 3 according to FIGS. 12 and 13, electric starting of a vehicle made with the vehicle drive-train 1 is possible, and the drive torque of the drive engine 2 can be assisted in the area of the electric machine 41 by the gear step KV2 of the splitter group 7. Gearshifts in the group transmission device 3 to carry out which it is only necessary in the splitter group 7 to disengage a gear KV1, KV2 or KV3 from the force flow of the vehicle drive-train 1 and to engage another of the gears KV1, KV2 or KV3 of the splitter group 7 in the force flow of the drive-train 1, can be carried out by the electric machine 41 while partially maintaining the traction force, between gears 1, 2 and 3, gears 4, 5 and 6, gears 7, 8 and 9, and gear 10, 11 and 12 for forward driving. Moreover, the main transmission 8 can also be synchronized by the electric machine 41. In addition, ISG functions such as recuperative operation and the like can be carried out by means of the electric machine 41.

INDEXES

1 Vehicle drive-train
2 Drive engine
3 Group transmission device
4 Drive output
5 Starting clutch
6 Transmission input shaft
7 Upstream splitter group
8 Main transmission
9 Downstream range group
10 Central transmission shaft
11 Loose wheel
12 Loose wheel
13 Loose wheel
14 Loose wheel
15 Loose wheel
16 Fixed wheel
17 Fixed wheel
18 Fixed wheel
19 Fixed wheel
20 First countershaft
21 Fixed wheel
22 Fixed wheel
23 Fixed wheel
24 Fixed wheel
25 Second countershaft
26 Intermediate wheel
27 Intermediate wheel
28 Fixed wheel
29 Fixed wheel
30 Planetary gearset
31 Sun gear
32 Planetary gear
33 Ring gear
34 Planetary carrier
35 Axle drive
36 Component fixed on the housing
37 Further planetary gearset
38 Ring gear
39 Sun gear
40 Rotor
41 Electric machine
42 Planetary gearwheel
43 Planetary carrier
44 Shifting element
45 Component fixed on the housing
46 Component fixed on the housing
A to J Shifting element
HV1, HV2 Gear step
HVR Gear step
KV1 to KV3 Gear step

The invention claimed is:

1. A group transmission device (3) comprising:
an electric machine (41),
a main transmission (8) of a countershaft design,
a splitter group (7) of countershaft design connected upstream of the main transmission (8), and
a range group (9) connected downstream of the main transmission (8),
in an area of the main transmission (8), the splitter group (7), and the range group (9), a gear ratio is variable by gear steps (KV1 to KV3, HV1, HV2, HVR) that are either engaged in, or disengaged from, by interlocking shifting elements (A to H) in a force flow of the group transmission device (3),
at least during a gearshift, torque from the electric machine (41) being transmittable in the area of the splitter group (7) into the force flow,
the splitter group (7) having at least three gear steps (KV1 to KV3) that are engagable or disengagable,
the main transmission (8) having at least two gear steps (HV1, HV2) that are engagable or disengagable, and
the range group (9) having at least two gear steps that are engagable or disengagable.

2. The group transmission device according to claim 1, further comprising a planetary gearset (37) which, in an area of a first shaft (38), is either connected to either an input shaft of the splitter group (7) or a transmission input shaft (6) or is functionally connected therewith by a first splitter shifting element (I), and which, in an area of a second shaft (43), is either coupled with a gear step (KV2) of the splitter group (7) to an output shaft (11) of the splitter group (7) and thus to an input shaft of the main transmission (8), or which is connectable thereto by the first splitter shifting element (I), and which, in an area of a third shaft (39), is either connected to the electric machine (41) or is functionally connected thereto by one of the first and another splitter shifting element (I; J).

3. The group transmission device according to claim 2, wherein the first shaft (38) is functionally connectable, via the another splitter shifting element (J), with either the electric machine (41) or a component (46) fixed to a housing.

4. The group transmission device according to claim 2, wherein the second shaft (43) is either coupled to a loose wheel (11) of the gear step (KV2) of the splitter group (7) that is mounted to rotate on the transmission input shaft (6) and connectable, in a rotationally fixed manner, to the transmission input shaft (6) by a further shifting element (C) or connectable, by the first shifting element (I), to the loose wheel (11), which meshes with at least one gearwheel (16, 21) of at least one countershaft (20, 25) and is connected with the main transmission (8) by the countershaft (20, 25).

5. The group transmission device according to claim 4, wherein the further shifting element (C) is arranged between the planetary gearset (37) and the gear step (KV2) of the splitter group (7) that is either connected or connectable to the second shaft (43).

6. The group transmission device according to claim 4, wherein the further shifting element (C) is arranged on a side of the gear step (KV2) of the splitter group (7) that is either connected or connectable to the second shaft (43), which faces away from the planetary gearset (37).

7. The group transmission device according to claim 4, wherein the further shifting element (C) is either an interlocking shifting element or a friction shifting element.

8. The group transmission device according to claim 2, wherein the second shaft (43) is couplable, via another splitter shifting element (J), to either a component (46) fixed to a housing or the electric machine (41).

9. The group transmission device according to claim 2, wherein the third shaft (39) is connectable, via another splitter shifting element (J), to either the first shaft (38) or the second shaft (43) of the planetary gearset (37).

10. The group transmission device according to claim 2, wherein the third shaft (39) is connectable to a component (45) fixed to a housing by an additional shifting element (44), which is a friction shifting element.

11. The group transmission device according to claim 2, wherein the first shaft (38) of the planetary gearset (37) is a ring gear, the second shaft (43) of the planetary gearset (37) is a planetary carrier and the third shaft (39) of the planetary gearset (37) is a sun gear.

12. The group transmission device according to claim 2, wherein the transmission input shaft (6) is connectable to a drive engine (2) of a vehicle drive-train (1) either via a friction clutch (5) or directly.

13. A group transmission (3) comprising:
- a splitter group having at least three gear steps that are connectable, via a transmission input shaft, to a drive engine to supply torque to the group transmission;
- a main transmission group having at least two gear steps that are connectable downstream of the splitter group, and the splitter group and the main transmission group having at least one common countershaft;
- a range group having at least two gear steps that are connectable downstream of the main transmission group;
- a plurality of interlocking shifting elements that are actuatable to individually engage or disengage combinations of the at least three gear steps of the splitter group, the at least two gear steps of the main transmission group, and the at least two gear steps of the range group so as to selectively implement different gear ratios of the group transmission along a power flow thereof;
- an electric machine that is engagable to input torque in the power flow;
- a planetary gear set arranged upstream of the splitter group, the planetary gear set comprising a ring gear continuously connected to a first shaft, a planetary carrier continuously connected to a second shaft, and a sun gear continuously connected to a third shaft;
  - the first shaft is either continuously connected to the transmission input shaft or is connectable, via one of the plurality of interlocking shifting elements, to the transmission input shaft,
  - the second shaft is either continuously connected to an output shaft of the splitter group and an input shaft of the main transmission group or is connectable, via another one of the plurality of interlocking shifting elements, to the output shaft of the splitter group and the input shaft of the main transmission group, and
  - the third shaft is either continuously connected to the electric machine or is connectable, via further one of the plurality of interlocking shifting elements, to the electric machine.

* * * * *